United States Patent
Cheng et al.

(10) Patent No.: US 12,167,183 B2
(45) Date of Patent: Dec. 10, 2024

(54) IMAGE PROCESSING METHOD, IMAGE PROCESSING APPARATUS, AND PHOTOGRAPHING APPARATUS

(71) Applicant: HUAWEI TECHNOLOGIES CO., LTD., Guangdong (CN)

(72) Inventors: Min Cheng, Shenzhen (CN); Daolong Tang, Shenzhen (CN); Yufeng Dai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 17/722,509

(22) Filed: Apr. 18, 2022

(65) Prior Publication Data

US 2022/0239881 A1 Jul. 28, 2022

Related U.S. Application Data

(63) Continuation of application No. PCT/CN2020/097733, filed on Jun. 23, 2020.

(30) Foreign Application Priority Data

Oct. 18, 2019 (CN) .......................... 201910996008.0
Dec. 23, 2019 (CN) .......................... 201911338696.8

(51) Int. Cl.
*H04N 9/77* (2006.01)
*H04N 5/33* (2023.01)
(Continued)

(52) U.S. Cl.
CPC ................ *H04N 9/77* (2013.01); *H04N 5/33* (2013.01); *H04N 23/15* (2023.01); *H04N 23/843* (2023.01)

(58) Field of Classification Search
CPC ............ H04N 9/77; H04N 5/33; H04N 23/15; H04N 23/843; H04N 25/136; H04N 25/447; H04N 9/67; H04N 9/64; H04N 23/84

See application file for complete search history.

(56) References Cited

U.S. PATENT DOCUMENTS 6,366,319 B1 * 4/2002 Bills .................... H04N 23/843
348/E9.01
2007/0159542 A1 7/2007 Luo
2016/0330414 A1 11/2016 Takado et al.

FOREIGN PATENT DOCUMENTS

CN 101236981 A 8/2008
CN 101715084 A 5/2010
(Continued)

*Primary Examiner* — Yogesh K Aggarwal
(74) *Attorney, Agent, or Firm* — HUAWEI TECHNOLOGIES CO., LTD.

(57) ABSTRACT

In an image processing method, an image processing device obtains an input image from an image sensor. Each pixel of the input image is either a type-I pixel or a type-II pixel. Each type-I pixel carries a luminance channel value and no color data, and each type-II pixel carries a single color channel value and no luminance data, wherein the single color channel value is a cyan channel value, a magenta channel value, or a yellow channel value. The image processing device generates a target image by performing interpolation based on the luminance channel values and the single color channel values of the pixels of the input image, wherein each pixel in the target image corresponds in location to a pixel in the input image and has three color channel values generated by the interpolation.

16 Claims, 15 Drawing Sheets

(51) Int. Cl.
*H04N 23/15* (2023.01)
*H04N 23/84* (2023.01)

(56) References Cited

FOREIGN PATENT DOCUMENTS

| | | | |
|---|---|---|---|
| CN | 102957917 | A | 3/2013 |
| CN | 103430551 | A | 12/2013 |
| CN | 104350744 | A | 2/2015 |
| CN | 104661008 | A | 5/2015 |
| CN | 107846537 | A | 3/2018 |
| CN | 109905681 | A | 6/2019 |
| CN | 111131798 | A | 5/2020 |
| EP | 3182453 | A1 | 6/2017 |
| JP | 2010097170 | A | 4/2010 |

\* cited by examiner

Arrangement manner 1   Arrangement manner 2   Arrangement manner 3   Arrangement manner 4

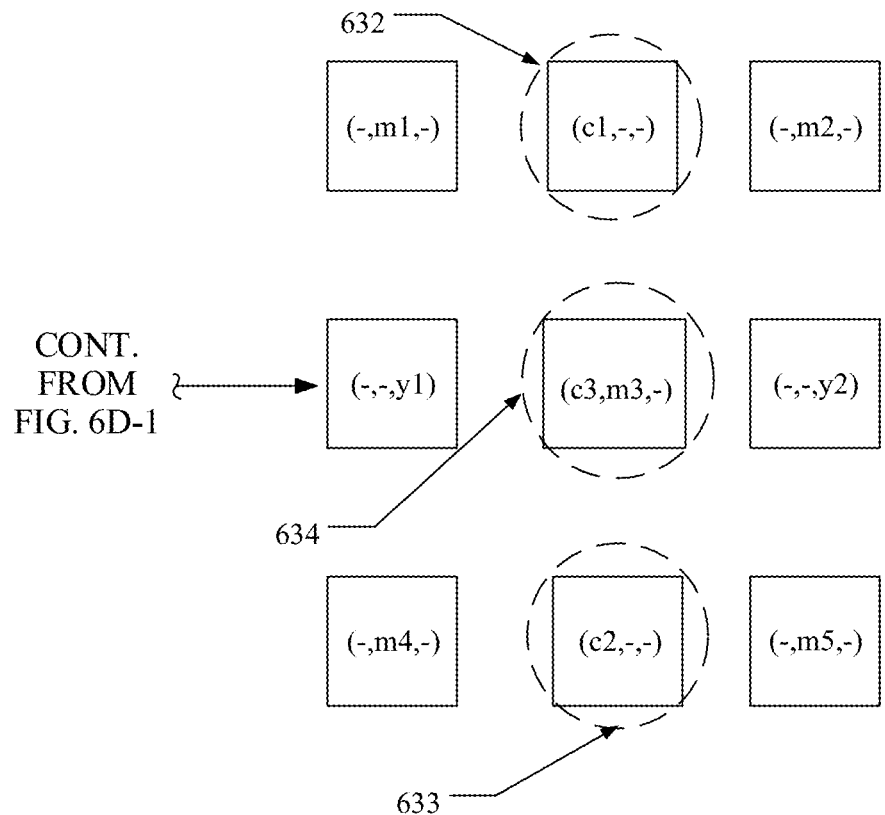
FIG. 6D-2
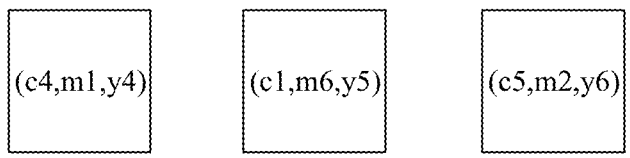
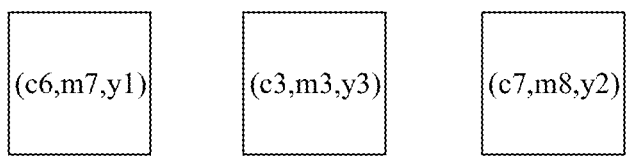
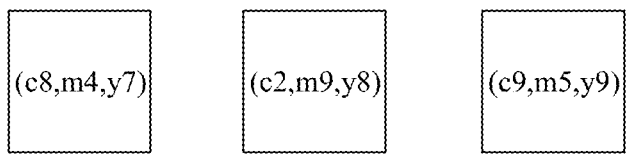
FIG. 6E

| (c4,m1,y4) | (c14,m14,y14) | (c1,m6,y5) | (c15,m15,y15) | (c5,m2,y6) |
|---|---|---|---|---|
| (c16,m16,y16) | (c10,m10,y10) | (c17,m17,y17) | (c11,m10,y10) | (c18,m18,y18) |
| (c6,m7,y1) | (c19,m19,y19) | (c3,m3,y3) | (c20,m20,y20) | (c7,m8,y2) |
| (c21,m21,y21) | (c12,m12,y12) | (c22,m22,y22) | (c13,m13,y13) | (c23,m23,y23) |
| (c8,m4,y7) | (c24,m24,y24) | (c2,m9,y8) | (c25,m25,y25) | (c9,m5,y9) |

FIG. 6G

| (L4) | (L3) | (L1) | (L3) | (L4) |
| --- | --- | --- | --- | --- |
| (L4) | (L1) | (L5) | (L1) | (L4) |
| (L4) | (L3) | (L1) | (L3) | (L4) |
| (L4) | (L2) | (L1) | (L2) | (L4) |
| (L4) | (L4) | (L1) | (L4) | (L4) |

| (c4,m4,y4) | (c3,m3,y3) | (c1,m1,y1) | (c3,m3,y3) | (c4,m4,y4) |
|---|---|---|---|---|
| (c4,m4,y4) | (c1,m1,y1) | (c5,m5,y5) | (c1,m1,y1) | (c4,m4,y4) |
| (c4,m4,y4) | (c3,m3,y3) | (c1,m1,y1) | (c3,m3,y3) | (c4,m4,y4) |
| (c4,m4,y4) | (c2,m2,y2) | (c1,m1,y1) | (c2,m2,y2) | (c4,m4,y4) |
| (c4,m4,y4) | (c4,m4,y4) | (c1,m1,y1) | (c4,m4,y4) | (c4,m4,y4) |

FIG. 6K

| (r4,g4,b4) | (r3,g3,b3) | (r1,g1,b1) | (r3,g3,b3) | (r4,g4,b4) |
|---|---|---|---|---|
| (r4,g4,b4) | (r1,g1,b1) | (r5,g5,b5) | (r1,g1,b1) | (r4,g4,b4) |
| (r4,g4,b4) | (r3,g3,b3) | (r1,g1,b1) | (r3,g3,b3) | (r4,g4,b4) |
| (r4,g4,b4) | (r2,g2,b2) | (r1,g1,b1) | (r2,g2,b2) | (r4,g4,b4) |
| (r4,g4,b4) | (r4,g4,b4) | (r1,g1,b1) | (r4,g4,b4) | (r4,g4,b4) |

FIG. 6L

IMAGE PROCESSING METHOD, IMAGE PROCESSING APPARATUS, AND PHOTOGRAPHING APPARATUS

CROSS-REFERENCE TO RELATED APPLICATIONS

This application is a continuation of International Application PCT/CN2020/097733, filed on Jun. 23, 2020, which claims priority to Chinese Patent Application No. 201911338696.8, filed on Dec. 23, 2019, and Chinese Patent Application No. 201910996008.0, filed on Oct. 18, 2019. All of the aforementioned priority patent applications are hereby incorporated by reference in their entirety.

TECHNICAL FIELD

Embodiments of this application relate to the surveillance photographing field, and in particular, to an image processing method, an image processing apparatus, and a photographing apparatus.

BACKGROUND

Low-illumination photographing apparatus that can be used in dark or low-light scenarios are often used for surveillance purposes. To improve the clarity of images output by a low-illumination photographing apparatus, researchers set a light compensation function by adding a light source around a camera of the low-illumination photographing apparatus. If white light is used for light compensation, however, an object to be monitored may notice the light pollution caused by the white light and take evasion measures. On the other hand, if infrared light is used for light compensation, although the infrared light cannot be perceived by human eyes, an image generated by an image sensor by capturing the infrared light is a gray-scale image that displays only shades. Consequently, the image is not suitable for recognizing the colors of an object being monitored. Therefore, currently it is common to use mixed white light and infrared light for light compensation. To prevent the reduction of image definition due to interference caused by the infrared light to the white light, optical splitting or time sharing are usually applied in processing the signals obtained by the image sensor.

To perform optical splitting, a special prism needs to be used to separate received visible light from received infrared light, so that one image sensor records the visible light to obtain a color image and another image sensor records the infrared light to obtain a gray-scale image. The color image and the gray-scale image are then separately processed. Finally, the color image and the gray-scale image are fused to obtain a target image. To perform time-sharing, one image sensor needs to be controlled to sense a previous frame of visible light and a current frame of infrared light. A color image that records the visible light and a gray-scale image that records the infrared light are then obtained by processing the two adjacent frames of data respectively. Finally, the color image and the gray-scale image are fused to obtain a target image.

In the optical splitting solution mentioned above, a special prism needs to be used to perform optical splitting on light, which leads to a complex system. Accuracy of registration of two images from two image sensors is relatively low, which leads to a poor output target image. In the time-sharing solution mentioned above, a time-sharing exposure apparatus needs to be used, which leads to a complex system. In addition, fusing two adjacent frames of images may cause motion smearing, which causes the obtained target image to be of poor quality.

SUMMARY

Embodiments of this application provide an image processing method, an image processing apparatus, and a photographing apparatus, so as to ensure that an image that is output by the photographing apparatus has rich colors and is sharp, and simplify a system structure.

According to a first aspect, an embodiment of this application provides an image processing method. The image processing method includes: An image processing apparatus obtains a first image from a target image sensor. The first image includes an I pixel group and an II pixel group. The I pixel group includes a plurality of I pixels, and the II pixel group includes a plurality of II pixels. In addition, each I pixel carries one luminance channel value, and each II pixel carries one color channel value. Moreover, both the I pixel and the II pixel are single-channel pixels. Then, the image processing apparatus determines a complementary color channel value of the color channel value based on the color channel value. Next, the image processing apparatus determines three channel values of a target pixel based on a luminance channel value carried by at least one I pixel and a complementary color channel value carried by at least one II pixel. The three channel values of the target pixel are used to indicate a color and luminance of the target pixel. Finally, the image processing apparatus outputs a target image including a plurality of target pixels.

In this embodiment, a color channel corresponding to the color channel value includes one of a cyan channel, a magenta channel, or a yellow channel; and a color channel corresponding to the complementary color channel value includes one of a red channel, a green channel, or a blue channel.

In this embodiment, each I pixel in the I pixel group in the first image obtained by the image processing apparatus from the target image sensor carries the luminance channel value, so that details of the target image that is output by the image processing apparatus are sharp. In addition, each II pixel in the II pixel group in the first image carries the color channel value, so that the target image that is output by the image processing apparatus has colors. Then, the target image is determined based on the foregoing I pixel group and the foregoing II pixel group, so that the foregoing image colors and the foregoing image details are fused to obtain the sharp target image with rich colors. In addition, in this solution, one image from one image sensor instead of two image sensors is processed, and a time-sharing system does not need to be set. This helps simplify an internal system of the image processing apparatus.

According to the first aspect, in a first implementation of the first aspect of the embodiments of this application, the method further includes: The image processing apparatus determines a luminance channel value of the II pixel based on the luminance channel value of the at least one I pixel. Then, the image processing apparatus determines a color channel value of the I pixel based on a color channel value of the at least one II pixel.

Optionally, after obtaining the first image from the target image sensor and before determining the complementary color channel value of the color channel value, the image processing apparatus may perform the foregoing steps.

In this implementation, in the first image, an II pixel is adjacent to or close to at least one I pixel, and the at least one I pixel around the II pixel carries a luminance channel value, so that a luminance channel value of the II pixel can be determined based on the luminance channel value of the at least one I pixel. By analogy, the luminance channel value of each II pixel in the II pixel group is determined based on the luminance channel value of each I pixel in the I pixel group. This helps determine luminance information of the II pixel. Therefore, an II pixel for which only color information is recorded also has luminance information, so that a contour and details of a photographed object can be reflected due to luminance of each pixel in the first image. In addition, because a color channel value of an I pixel may be determined based on a color channel value of an II pixel, an I pixel for which only luminance information is recorded may also have color information, so that a color presented by the photographed object can be reflected due to a color of each pixel in the first image.

According to the first implementation of the first aspect, in a second implementation of the first aspect of the embodiments of this application, color channels corresponding to color channel values of the II pixel are the same as color channels corresponding to color channel values of the I pixel. That the image processing apparatus determines a color channel value of the I pixel based on a color channel value of the at least one II pixel includes: determining a cyan channel value of the I pixel based on a cyan channel value of the at least one II pixel; determining a magenta channel value of the I pixel based on a magenta channel value of the at least one II pixel; and determining a yellow channel value of the I pixel based on a yellow channel value of the at least one II pixel.

In this implementation, an optional manner of determining a color channel value of an I pixel is provided. In this implementation, the image processing apparatus performs an interpolation operation based on a same color channel value. This helps ensure accuracy of an interpolation result and reduce pixel errors. In addition, in this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a color channel value obtained through interpolation calculation may be more realistic.

According to the first implementation of the first aspect, in a third implementation of the first aspect of the embodiments of this application, color channels corresponding to color channel values of the II pixel are not exactly the same as color channels corresponding to color channel values of the I pixel. That the image processing apparatus determines a color channel value of the I pixel based on a color channel value of the at least one II pixel includes: determining a cyan channel value of the I pixel based on at least one of a cyan channel value, a magenta channel value, or a yellow channel value in the II pixel group; determining a magenta channel value of the I pixel based on at least one of the cyan channel value, the magenta channel value, or the yellow channel value in the II pixel group; and determining a yellow channel value of the I pixel based on at least one of the cyan channel value, the magenta channel value, or the yellow channel value in the II pixel group.

In this implementation, another optional manner of determining a color channel value of an I pixel is provided. In this implementation, the image processing apparatus performs an interpolation operation based on different color channel values. This helps make an image obtained after interpolation have rich colors. In addition, in this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a color channel value obtained through interpolation calculation may be more realistic.

According to the first aspect and the first implementation of the first aspect to the third implementation of the first aspect, in a fourth implementation of the first aspect of the embodiments of this application, the method further includes: The image processing apparatus determines three color channel values of a first II pixel based on different color channel values of one or more II pixels around the first II pixel.

In this implementation, an II pixel in the first image has only one color channel value, and one color channel value cannot present a color. Therefore, the image processing apparatus needs to supplement three color channel values of the II pixel, so that the II pixel can reflect a color.

According to the fourth implementation of the first aspect, in a fifth implementation of the first aspect of the embodiments of this application, the image processing apparatus determines three color channel values of a first II pixel based on different color channel values of one or more II pixels around the first II pixel includes one or more of the following: determining a cyan channel value of the second II pixel based on at least two of a cyan channel value, a magenta channel value, or a yellow channel value of the one or more II pixels around the first II pixel; determining a magenta channel value of the second II pixel based on at least two of the cyan channel value, the magenta channel value, or the yellow channel value of the one or more II pixels around the first II pixel; and determining a yellow channel value of the second II pixel based on at least two of the cyan channel value, the magenta channel value, or the yellow channel value of the one or more II pixels around the first II pixel.

In this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a complementary color channel value obtained through interpolation calculation may be more realistic.

According to the first aspect and the first implementation of the first aspect to the fifth implementation of the first aspect, in a sixth implementation of the first aspect of the embodiments of this application, that the image processing apparatus determines a luminance channel value of the II pixel based on the luminance channel value of the at least one I pixel includes: determining a luminance channel value of the first II pixel based on a luminance channel value of at least one I pixel around the first II pixel.

In this implementation, in the first image, an II pixel is adjacent to or close to at least one I pixel, and the at least one I pixel around the II pixel carries a luminance channel value, so that a luminance channel value of the II pixel can be determined based on the luminance channel value of the at least one I pixel. By analogy, the luminance channel value of each II pixel in the II pixel group is determined based on the luminance channel value of each I pixel in the I pixel group. This helps determine luminance information of the II pixel. Therefore, an II pixel for which only color information is recorded also has luminance information, so that a contour and details of a photographed object can be reflected due to luminance of each pixel in the first image.

According to the fourth implementation of the first aspect to the sixth implementation of the first aspect, in a seventh implementation of the first aspect of the embodiments of this application, that the image processing apparatus determines a complementary color channel value of the color channel value includes: respectively converting three color channel values of the II pixel into three complementary color channel values of the II pixel; and respectively converting three color channel values of the I pixel into three complementary color channel values of the I pixel.

In an optional implementation, after supplementing missing color channel values of the foregoing II pixel, the image processing apparatus may replace the three color channel values of the II pixel with the complementary color channel values. For example, if a specific II pixel has only a cyan channel value, the image processing apparatus first determines a magenta channel value and a yellow channel value of the II pixel, and then converts the foregoing three color channel values into complementary color channel values.

In another optional implementation, the image processing apparatus may directly convert each color channel value in the first image into a complementary color channel value, and then supplement the remaining complementary color channel values of the II pixel. For example, if a specific II pixel has only a cyan channel value, the image processing apparatus first converts the cyan channel value of the II pixel into a magenta channel value, and then determines a green channel and a blue channel value of the II pixel.

In this implementation, the cyan channel value, the magenta channel value, and the yellow channel value are respectively converted into the red channel value, the green channel value, and the blue channel value. This helps perform an RGB pixel processing procedure (for example, a black level correction, shadow correction, defect pixel removal, white balance, raw-domain noise reduction, mosaic removal, or color correction) after a relatively accurate color channel value of each pixel is obtained, and helps simplify the internal system of the image processing apparatus.

According to the first aspect and the first implementation of the first aspect to the seventh implementation of the first aspect, in an eighth implementation of the first aspect of the embodiments of this application, that the image processing apparatus determines three channel values of a target pixel based on a luminance channel value carried by at least one I pixel and a complementary color channel value carried by at least one II pixel includes: fusing a second image and a third image to obtain the target image. The second image carries the luminance channel value of the I pixel and the luminance channel value of the II pixel, and the third image carries the three complementary color channel values of the II pixel and the three complementary color channel values of the I pixel.

In this implementation, because the foregoing second image carries only a luminance channel value, only luminance can be reflected and a color cannot be reflected; and because the foregoing third image carries only a color channel value, only a color can be reflected and luminance cannot be reflected. Therefore, the image processing apparatus needs to fuse the second image and the third image to determine the target image. Each pixel in the target image carries luminance information and color information. Therefore, the target image may reflect color and luminance distribution of light recorded by the target image sensor. This helps obtain a target image with rich colors and sharp details.

According to the first aspect and the first implementation of the first aspect to the eighth implementation of the first aspect, in a ninth implementation of the first aspect of the embodiments of this application, the target image sensor includes a colorless sensing unit group and a colored sensing unit group. The colorless sensing unit group is configured to record luminance information of visible light or infrared light to obtain the I pixel group, and the colored sensing unit group is configured to record color information of the visible light to obtain the II pixel group.

According to a second aspect, an embodiment of this application provides an image processing apparatus. The image processing apparatus includes an obtaining module, a determining module, and an output module. The obtaining module is configured to obtain a first image from a target image sensor. The determining module is configured to determine a complementary color channel value of a color channel value based on the color channel value. The determining module is further configured to determine three channel values of a target pixel based on a luminance channel value carried by at least one I pixel and a complementary color channel value carried by at least one II pixel. The three channel values of the target pixel are used to indicate a color and luminance of the target pixel. Finally, the output module is configured to output a target image including a plurality of target pixels.

It should be understood that the first image includes an I pixel group and an II pixel group. The I pixel group includes a plurality of I pixels, and the II pixel group includes a plurality of II pixels. In addition, each I pixel carries one luminance channel value, and each II pixel carries one color channel value. Moreover, both the I pixel and the II pixel are single-channel pixels.

It should be further understood that a color channel corresponding to the color channel value includes one of a cyan channel, a magenta channel, or a yellow channel; and a color channel corresponding to the complementary color channel value includes one of a red channel, a green channel, or a blue channel.

In this embodiment, each I pixel in the I pixel group in the first image obtained by the image processing apparatus from the target image sensor carries the luminance channel value, so that details of the target image that is output by the image processing apparatus are sharp. In addition, each II pixel in the II pixel group in the first image carries the color channel value, so that the target image that is output by the image processing apparatus has colors. Then, the target image is determined based on the foregoing I pixel group and the foregoing II pixel group, so that the foregoing image colors and the foregoing image details are fused to obtain the sharp target image with rich colors. In addition, in this solution, one image from one image sensor instead of two image sensors is processed, and a time-sharing system does not need to be set. This helps simplify an internal system of the image processing apparatus.

According to the second aspect, in a first implementation of the second aspect of the embodiments of this application, the determining module is further configured to determine a luminance channel value of the II pixel based on the luminance channel value of the at least one I pixel. The determining module is further configured to determine a color channel value of the I pixel based on a color channel value of the at least one II pixel.

In this implementation, in the first image, an II pixel is adjacent to or close to at least one I pixel, and the at least one I pixel around the II pixel carries a luminance channel value, so that a luminance channel value of the II pixel can be determined based on the luminance channel value of the at least one I pixel. By analogy, the luminance channel value of each II pixel in the II pixel group is determined based on the luminance channel value of each I pixel in the I pixel group. This helps determine luminance information of the II pixel. Therefore, an II pixel for which only color information is recorded also has luminance information, so that a contour and details of a photographed object can be reflected due to luminance of each pixel in the first image. In addition, because a color channel value of an I pixel may be determined based on a color channel value of an II pixel, an I pixel for which only luminance information is recorded may also have color information, so that a color presented by the photographed object can be reflected due to a color of each pixel in the first image.

According to the first implementation of the second aspect, in a second implementation of the second aspect of the embodiments of this application, color channels corresponding to color channel values of the II pixel are the same as color channels corresponding to color channel values of the I pixel. The determining module is specifically configured to: determine a cyan channel value of the I pixel based on a cyan channel value of the at least one II pixel; determine a magenta channel value of the I pixel based on a magenta channel value of the at least one II pixel; and determine a yellow channel value of the I pixel based on a yellow channel value of the at least one II pixel.

In this implementation, an optional manner of determining a color channel value of an I pixel is provided. In this implementation, the image processing apparatus performs an interpolation operation based on a same color channel value. This helps ensure accuracy of an interpolation result and reduce pixel errors. In addition, in this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a color channel value obtained through interpolation calculation may be more realistic.

According to the first implementation of the second aspect, in a third implementation of the second aspect of the embodiments of this application, color channels corresponding to color channel values of the II pixel are not exactly the same as color channels corresponding to color channel values of the I pixel. The determining module is specifically configured to: determine a cyan channel value of the I pixel based on at least one of a cyan channel value, a magenta channel value, or a yellow channel value in the II pixel group; determine a magenta channel value of the I pixel based on at least one of the cyan channel value, the magenta channel value, or the yellow channel value in the II pixel group; and determine a yellow channel value of the I pixel based on at least one of the cyan channel value, the magenta channel value, or the yellow channel value in the II pixel group.

In this implementation, another optional manner of determining a color channel value of an I pixel is provided. In this implementation, the image processing apparatus performs an interpolation operation based on different color channel values. This helps make an image obtained after interpolation have rich colors. In addition, in this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a color channel value obtained through interpolation calculation may be more realistic.

According to the second aspect and the first implementation of the second aspect to the third implementation of the second aspect, in a fourth implementation of the second aspect of the embodiments of this application, the determining module is further configured to determine three color channel values of a first II pixel based on different color channel values of one or more II pixels around the first II pixel.

In this implementation, an II pixel in the first image has only one color channel value, and one color channel value cannot present a color. Therefore, the image processing apparatus needs to supplement three color channel values of the II pixel, so that the II pixel can reflect a color.

According to the fourth implementation of the second aspect, in a fifth implementation of the second aspect of the embodiments of this application, the determining module is specifically configured to: determine a cyan channel value of the second II pixel based on at least two of a cyan channel value, a magenta channel value, or a yellow channel value of the one or more II pixels around the first II pixel; determine a magenta channel value of the second II pixel based on at least two of the cyan channel value, the magenta channel value, or the yellow channel value of the one or more II pixels around the first II pixel; and determine a yellow channel value of the second II pixel based on at least two of the cyan channel value, the magenta channel value, or the yellow channel value of the one or more II pixels around the first II pixel.

In this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a complementary color channel value obtained through interpolation calculation may be more realistic.

According to the second aspect and the first implementation of the second aspect to the fifth implementation of the second aspect, in a sixth implementation of the second aspect of the embodiments of this application, the determining module is specifically configured to determine a luminance channel value of the first II pixel based on a luminance channel value of at least one I pixel around the first II pixel.

In this implementation, in the first image, an II pixel is adjacent to or close to at least one I pixel, and the at least one I pixel around the II pixel carries a luminance channel value, so that a luminance channel value of the II pixel can be determined based on the luminance channel value of the at least one I pixel. By analogy, the luminance channel value of each II pixel in the II pixel group is determined based on the luminance channel value of each I pixel in the I pixel group. This helps determine luminance information of the II pixel. Therefore, an II pixel for which only color information is recorded also has luminance information, so that a contour and details of a photographed object can be reflected due to luminance of each pixel in the first image.

According to the fourth implementation of the second aspect to the sixth implementation of the second aspect, in a seventh implementation of the second aspect of the embodiments of this application, the determining module is specifically configured to: respectively convert three color channel values of the II pixel into three complementary color channel values of the II pixel; and respectively convert three color channel values of the I pixel into three complementary color channel values of the I pixel.

In an optional implementation, after supplementing missing color channel values of the foregoing II pixel, the image processing apparatus may replace the three color channel values of the II pixel with the complementary color channel values. For example, if a specific II pixel has only a cyan channel value, the image processing apparatus first determines a magenta channel value and a yellow channel value of the II pixel, and then converts the foregoing three color channel values into complementary color channel values.

In another optional implementation, the image processing apparatus may directly convert each color channel value in the first image into a complementary color channel value, and then supplement the remaining complementary color channel values of the II pixel. For example, if a specific II pixel has only a cyan channel value, the image processing apparatus first converts the cyan channel value of the II pixel into a magenta channel value, and then determines a green channel and a blue channel value of the II pixel.

In this implementation, the cyan channel value, the magenta channel value, and the yellow channel value are respectively converted into the red channel value, the green channel value, and the blue channel value. This helps perform an RGB pixel processing procedure (for example, a black level correction, shadow correction, defect pixel removal, white balance, raw-domain noise reduction, mosaic removal, or color correction) after a relatively accurate color channel value of each pixel is obtained, and helps simplify the internal system of the image processing apparatus.

According to the second aspect and the first implementation of the second aspect to the seventh implementation of the second aspect, in an eighth implementation of the second aspect of the embodiments of this application, the determining module is specifically configured to fuse a second image and a third image to obtain the target image. The second image carries the luminance channel value of the I pixel and the luminance channel value of the II pixel, and the third image carries the three complementary color channel values of the II pixel and the three complementary color channel values of the I pixel.

In this implementation, because the foregoing second image carries only a luminance channel value, only luminance can be reflected and a color cannot be reflected; and because the foregoing third image carries only a color channel value, only a color can be reflected and luminance cannot be reflected. Therefore, the image processing apparatus needs to fuse the second image and the third image to determine the target image. Each pixel in the target image carries luminance information and color information. Therefore, the target image may reflect color and luminance distribution of light recorded by the target image sensor. This helps obtain a target image with rich colors and sharp details.

According to the second aspect and the first implementation of the second aspect to the eighth implementation of the second aspect, in a ninth implementation of the second aspect of the embodiments of this application, the target image sensor includes a colorless sensing unit group and a colored sensing unit group. The colorless sensing unit group is configured to record luminance information of visible light or infrared light to obtain the I pixel group, and the colored sensing unit group is configured to record color information of the visible light to obtain the II pixel group.

According to a third aspect, an embodiment of this application provides an image processing apparatus. The image processing apparatus includes a processor and a memory. The memory is configured to store data or a program processed by the processor, and the processor is configured to perform the method according to the first aspect and the implementations of the first aspect.

According to a fourth aspect, an embodiment of this application provides an image processing apparatus. The image processing apparatus may be an image signal processor, or may be a function unit having an image processing function or a chip having an image processing function. The image processing apparatus may include a processing unit and a storage unit. When the image processing apparatus may be a function unit having an image processing function, the processing unit may be a processor, and the storage unit may be a memory. The storage unit is configured to store instructions, and the processing unit executes the instructions stored in the storage unit, so that the image processing apparatus performs the method according to the first aspect or any implementation of the first aspect. When the image processing apparatus is a chip having an image processing function, the storage unit may be a storage unit (for example, a register or a cache) in the chip, or may be a storage unit (for example, a read-only memory or a random access memory) outside the chip, and the processing unit may be a processor. The processing unit executes the instructions stored in the storage unit, so that the image process apparatus performs the method according to the first aspect or any implementation of the first aspect. Optionally, the image processing apparatus further includes a communications unit, and the communications unit may be an input/output interface, a pin, a circuit, or the like.

According to a fifth aspect, an embodiment of this application provides a photographing apparatus. The photographing apparatus includes a lens, a target image sensor, and an image processing apparatus. The lens is configured to converge light on the target image sensor. The target image sensor is configured to record the light by using two groups of sensing units, to obtain a first image. The first image includes an I pixel group determined by a colorless sensing unit group and an II pixel group determined by a colored sensing unit group, each I pixel in the I pixel group carries one luminance channel value, and each II pixel in the II pixel group carries one color channel value. The image processing apparatus is configured to process the first image, to implement the method according to the first aspect or any implementation of the first aspect. According to the fifth aspect, in a first implementation of the fifth aspect of the embodiments of this application, the photographing apparatus further includes a light filter, and the light filter is located between the lens and the target image sensor. The light filter is configured to perform filtering on the light.

According to the first implementation of the fifth aspect, in a second implementation of the fifth aspect of the embodiments of this application, the light filter includes an infrared cut-off filter or a double-pass filter. The infrared cut-off filter is configured to remove infrared light, and the double-pass filter is configured to allow visible light and infrared light of a preset band to pass through.

According to a sixth aspect, an embodiment of this application provides a computer readable storage medium, including instructions. When the instructions are run on a computer, the computer is enabled to perform the method according to the first aspect and the implementations of the first aspect.

According to a seventh aspect, an embodiment of this application provides a computer program product. When the computer program product runs on a computer, the computer is enabled to perform the method according to the first aspect and the implementations of the first aspect.

It can be learned from the foregoing technical solutions that the embodiments of this application have the following advantages:

In the embodiments, each I pixel in the I pixel group in the first image obtained by the image processing apparatus from the target image sensor carries the luminance channel value, so that details of the target image that is output by the image processing apparatus are sharp. In addition, each II pixel in the II pixel group in the first image carries the color channel value, so that the target image that is output by the image processing apparatus has colors. Then, the target image is determined based on the foregoing I pixel group and the foregoing II pixel group, so that the foregoing image colors and the foregoing image details are fused to obtain the sharp target image with rich colors. In addition, in the solutions, one image from one image sensor instead of two image sensors is processed, and a time-sharing system does not need to be set. This helps simplify an internal system of the image processing apparatus.

BRIEF DESCRIPTION OF DRAWINGS

To describe the technical solutions in the embodiments of this application more clearly, the following briefly describes the accompanying drawings for describing the embodiments. It is clearly that the accompanying drawings in the following descriptions show merely some embodiments of this application.

FIG. 6D-1 and FIG. 6D-2 are a schematic diagram of another embodiment of an image processing method according to an embodiment of this application;

FIG. 6E is a schematic diagram of another embodiment of an image processing method according to an embodiment of this application;

FIG. 6G is a schematic diagram of another embodiment of an image processing method according to an embodiment of this application;

FIG. 6K is a schematic diagram of another embodiment of an image processing method according to an embodiment of this application;

FIG. 6L is a schematic diagram of another embodiment of an image processing method according to an embodiment of this application;

DESCRIPTION OF EMBODIMENTS

The following clearly describes the technical solutions in the embodiments of this application with reference to the accompanying drawings in the embodiments of this application. It is clear that the described embodiments are merely some but not all of the embodiments of this application.

In this specification, the claims, and the accompanying drawings of this application, terms "first", "second", "third", "fourth", and the like (if existent) are intended to distinguish between similar objects but do not necessarily indicate a specific order or sequence. It should be understood that data used in such a way are interchangeable in an appropriate case, so that the embodiments described herein can be implemented in another order than the order illustrated or described herein. Moreover, terms "include", "have", and any other variants thereof mean to cover non-exclusive inclusion. For example, a process, method, system, product, or device that includes a list of steps or units is not necessarily limited to those steps or units, but may include other steps or units not expressly listed or inherent to such a process, method, product, or device.

The embodiments of this application provide an image processing method, an image processing apparatus, and a photographing apparatus, so as to ensure that an image that is output by the photographing apparatus (for example, a camera) has rich colors and is sharp, and simplify a system structure.

For ease of understanding, the following first describes an application scenario of the image processing method provided in the embodiments of this application.

The image processing method and the photographing apparatus provided in the embodiments of this application may be applied to a surveillance scenario in a low-illumination environment. Specifically, the low-illumination environment is an environment in which illumination intensity is less than a specific value, and is generally measured by energy of visible light received per unit area by an image sensor on the photographing apparatus, where a unit is Lux (also referred to as Lx for short). Generally, an environment in which illumination is greater than 0 Lux and less than 1 Lux may be referred to as the low-illumination environment. Specifically, the low-illumination environment may be an outdoor dark street, for example, a street at night or a street in a rainy day; or may be an indoor environment with weak light, for example, a store or a warehouse with weak light. This is not specifically limited herein.

Figure 1:
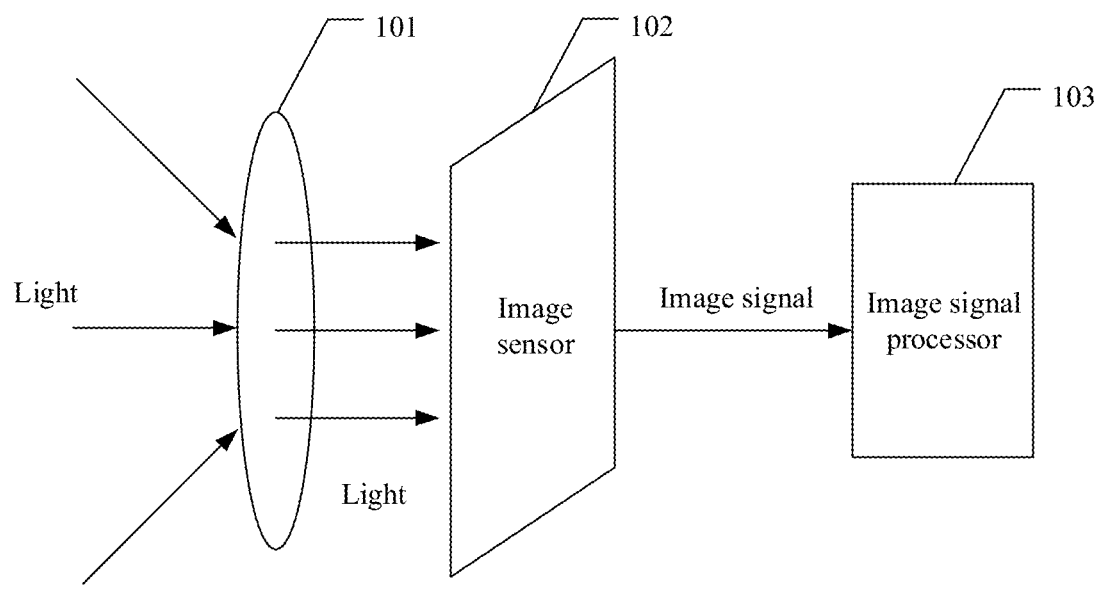
FIG. 1 is a schematic diagram of a structure of a common photographing apparatus.

In the embodiments, for ease of describing the photographing apparatus provided in the embodiments of this application, the following describes a structure of a common photographing apparatus. As shown in FIG. 1, the common photographing apparatus includes a lens 101, an image sensor 102, and an image signal processor 103. The lens 101 may converge, on the image sensor 102, light emitted or reflected by a photographed object. Then, the image sensor 102 converts the received optical signal into an image signal (for example, an original image or a first image described below), and transmits the image signal to the image signal processor 103. Next, the image signal processor 103 processes the image signal to output an image (usually an RGB image) that records the photographed object. In the foregoing process, if the light recorded by the image sensor 102 is infrared light, the image that is output by the image signal processor 103 may present a contour and details of the photographed object, but cannot display a color of the photographed object. If the light recorded by the image sensor 102 is visible light, a light sensitivity effect of the image sensor 102 is poor because light in a low-illumination environment is weak. In this case, the image that is output by the image sensor 102 is not sharp enough although a color is displayed.

Figure 2:
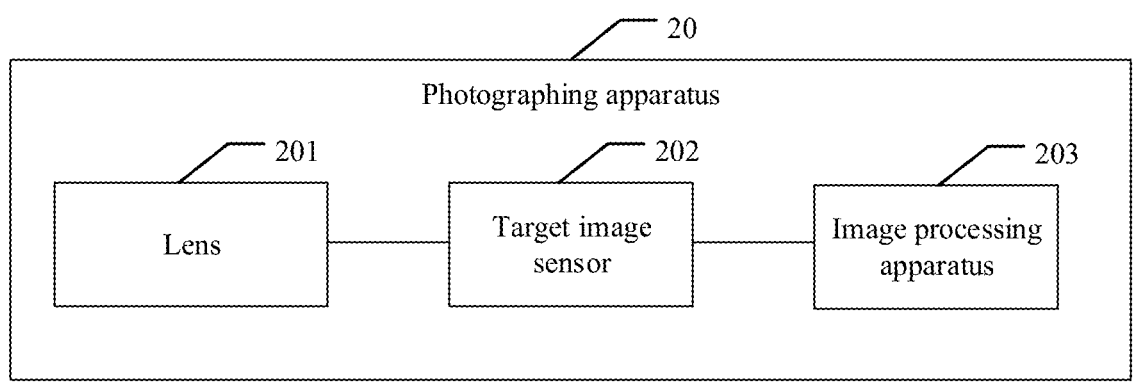
FIG. 2 is a schematic diagram of an embodiment of a photographing apparatus in an image processing method according to an embodiment of this application.

Therefore, according to the image processing method and the photographing apparatus provided in the embodiments of this application, features of the image sensor for sensing infrared light and visible light may be combined, and an original image is processed as a target image that records the details and the color of the photographed object. Specifically, FIG. 2 shows a main structure of a photographing apparatus according to an embodiment of this application. The photographing apparatus 20 includes a lens 201, a target image sensor 202, and an image processing apparatus 203. The lens 201 may simultaneously converge visible light and infrared light on the target image sensor 202, and the target image sensor 202 uses photosensitive components that are arranged in a specific arrangement manner, to record a CMY color channel value of the visible light and a luminance channel value of the infrared light in a same image signal (for example, the original image or the first image described below). Then, the image processing apparatus 203 processes the image signal to output a target image with sharp details and rich colors. In this embodiment, there is only one image sensor (namely, the target image sensor 202) in the photographing apparatus 20. It can also be understood that there is only one image sensor in this embodiment of this application. Correspondingly, in the image processing method provided in the embodiments of this application, a target image may be obtained by processing only one original image. It can also be understood that the target image sensor outputs only one original image that is used to determine the target image, and the target image does not need to be determined by using a plurality of original images. Optionally, there is only one lens 201 in the photographing apparatus 20.

It should be understood that the target image sensor 202 is different from the image sensor 102. Therefore, before the foregoing image processing method is described, the following first describes the target image sensor in the photographing apparatus provided in this embodiment of this application.

An embodiment of this application provides a target image sensor. The target sensor includes a plurality of sensing units. Each sensing unit includes a microlens, a color filter layer, and a photodiode. The color filter layer is located between the microlens and the photodiode to perform filtering on light of some bands in light converged by the microlens. The color filter layer is made of a transparent material, so that specific light passes through the color filter layer to reach the photodiode. Each sensing unit corresponds to one pixel in the original image. Specifically, detailed descriptions are provided below.

In this embodiment, when the color filter layer is a colorless transparent film, the sensing unit is a colorless sensing unit, and the colorless sensing unit may also be referred to as a white (white, W) sensing unit. In this case, the color filter layer does not perform filtering on light that passes through the color filter layer. Therefore, light of any band can reach the photodiode through the color filter layer, for example, visible light of a band ranging from 400 nm to 750 nm or infrared light of a band ranging from 750 nm to 1 mm. Therefore, the colorless sensing unit can sense the foregoing light of any band. For example, the colorless sensing unit may sense visible light such as white light, red light, and yellow light, and the colorless sensing unit may also sense invisible light such as infrared light. This is not specifically limited herein. In addition, when the color filter layer of the sensing unit is a colored transparent film, the sensing unit is a colored sensing unit. In this case, the color filter layer allows only light of a specific band to pass through. The color filter layer differently absorbs or reflects light of different bands, bands of light passing through the color filter layer are different, and presented colors of light of different bands are different to human eyes. Generally, the color filter layer allows light of a same color as the color filter layer to pass through, and reflects or absorbs light of another color. For example, when the color filter layer is a yellow color filter layer, only yellow light reaches the photodiode through the color filter layer.

In this embodiment, the target image sensor includes a plurality of colorless sensing units and a plurality of colored sensing units. A set of colorless sensing units may be referred to as a colorless sensing unit group, and a set of colored sensing units may be referred to as a colorless sensing unit group. A ratio between a quantity of colorless sensing units and a quantity of colored sensing units in the target image sensor varies with a manner of arranging the plurality of colorless sensing units and the plurality of colored sensing units in the target image sensor.

Figure 3A:
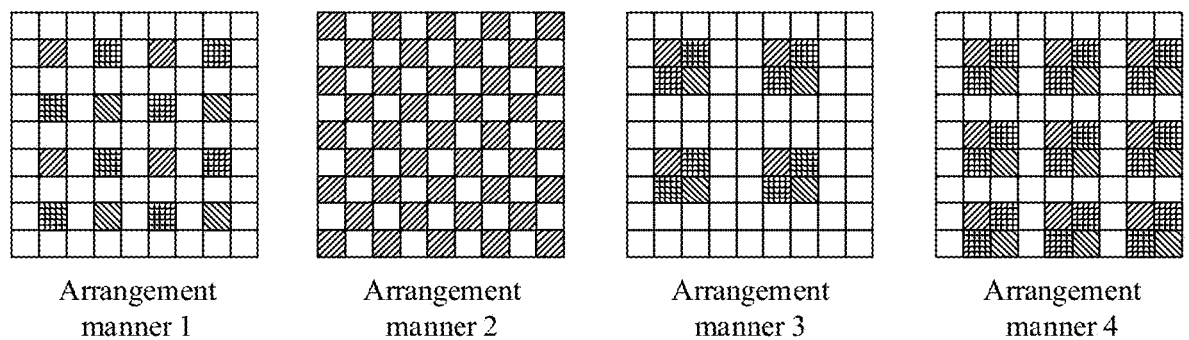
FIG. 3A is a schematic diagram of an embodiment of a target image sensor in an image processing method according to an embodiment of this application.

Specifically, the plurality of colored sensing units are discretely distributed between the plurality of colorless sensing units. It can also be understood that the plurality of colorless sensing units are discretely distributed between the plurality of color sensing units. For example, a manner of arranging a colorless sensing unit and a colored sensing unit in the target image sensor may be shown in FIG. 3A. A shadowed unit is a colored sensing unit, and a shadowless unit is a colorless sensing unit. Further, shadowed sensing units with different textures represent colored sensing units that sense different colors, for example, as shown in an arrangement manner 1, an arrangement manner 3, and an arrangement manner 4. It should be understood that FIG. 3A is merely an example of four arrangement manners enumerated for ease of understanding. During actual application, another arrangement manner may be used. A manner of arranging a colored sensing unit and a colorless sensing unit in the target image sensor is not limited in this embodiment of this application.

In this embodiment, when the color filter layer of the target image sensor includes a transparent color filter layer and a three-primary-color complementary color filter layer, the foregoing colored sensing unit includes two or three of a cyan (cyan, C) sensing unit, a magenta (magenta, M) sensing unit, and a yellow (yellow, Y) sensing unit. Herein, cyan is complementary to red (red, R), magenta is complementary to green (green, G), and yellow is complementary to blue (blue, B), where red, green, and blue are referred to as three primary colors. It can also be understood that the colored sensing unit group of the target image sensor in this embodiment of this application may include only a cyan sensing unit and a yellow sensing unit, or may include only a cyan sensing unit and a magenta sensing unit, or may include only a magenta sensing unit and a yellow sensing unit, or may include three colors: a cyan sensing unit, a magenta sensing unit, and a yellow sensing unit. This is not specifically limited herein. Magenta is also known as pinkish red.

During actual application, because a light sensitivity feature of the magenta sensing unit is better than light sensitivity features of the other two colors, when the target image sensor is configured, the magenta sensing unit may be preferably selected, or a proportion of magenta sensing units in the target image sensor may be increased. In other words, a quantity of magenta sensing units is greater than a quantity of cyan sensing units, and the quantity of magenta sensing units is greater than a quantity of yellow sensing units. Therefore, in the foregoing original image obtained by the target image sensor, a quantity of magenta pixels is greater than a quantity of cyan pixels and a quantity of yellow pixels. Optionally, the quantity of magenta sensing units is greater than or equal to a sum of the quantity of cyan sensing units and the quantity of yellow sensing units. Specifically, when the target image sensor includes both a colorless sensing unit and a colored sensing unit, and the colored sensing unit includes three colors: cyan, magenta, and yellow, a set of color filter layers in the target image sensor may be referred to as a CMYW color filter layer. Optionally, a ratio between cyan sensing units, yellow sensing units, and magenta sensing units may be set to 1:1:2.

Figure 3B:
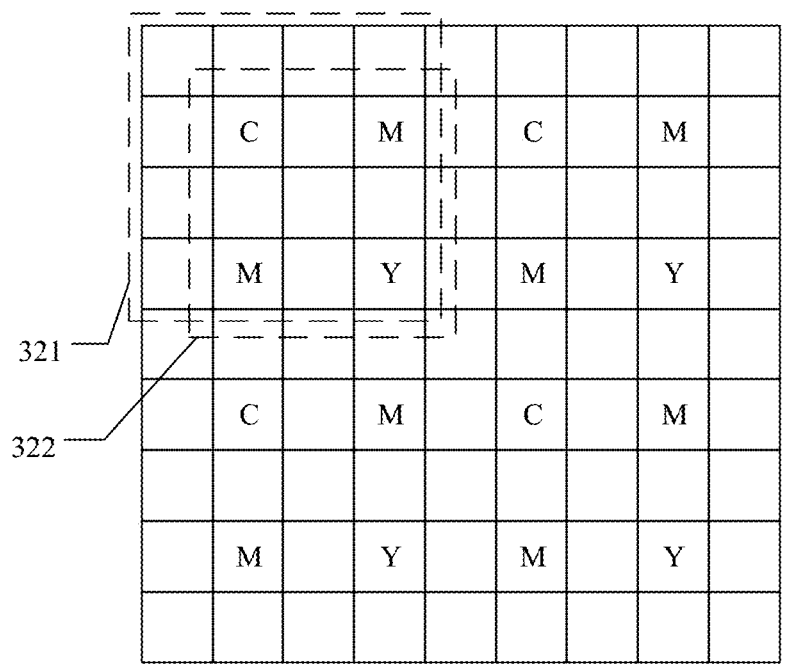
FIG. 3B is a schematic diagram of another embodiment of a target image sensor in an image processing method according to an embodiment of this application.

For example, when the colored sensing units in the target image sensor are arranged in the foregoing color ratio 1:1:2, the colored sensing units in the target image sensor may be arranged in an arrangement manner shown in FIG. 3B. A sensing unit group 321 having four rows and four columns is used as an example for description. The sensing unit group 321 includes twelve colorless sensing units and four colored sensing units. The cyan sensing unit and the yellow sensing unit are distributed in a main diagonal, and are respectively located at an upper left corner and a lower right corner of a sensing unit group 322 having three rows and three columns. The two magenta sensing units are distributed in a secondary diagonal, and are respectively located at an upper right corner and a lower left corner of the sensing unit group 322 having three rows and three columns.

Figure 3C:
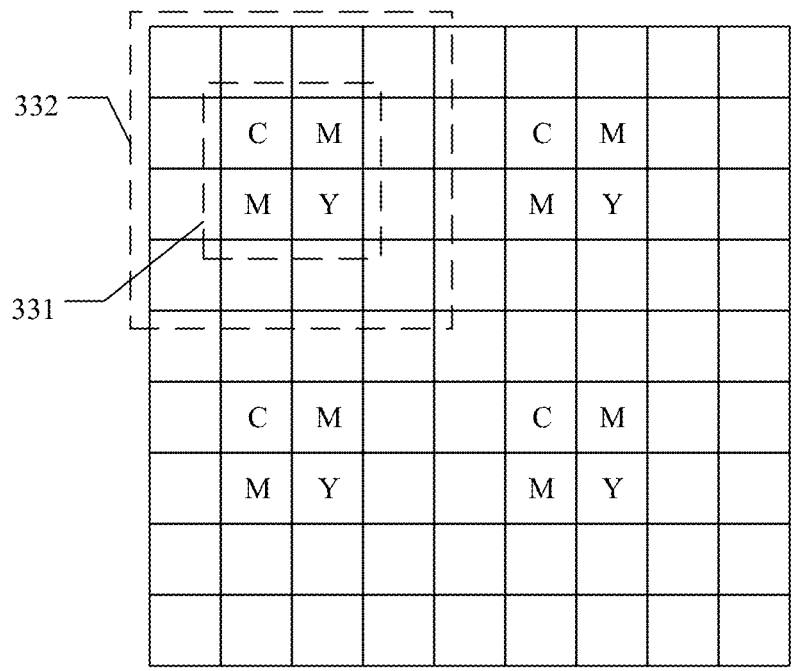
FIG. 3C is a schematic diagram of another embodiment of a target image sensor in an image processing method according to an embodiment of this application.

For another example, the colored sensing units in the target image sensor may be arranged in an arrangement manner shown in FIG. 3C. A colored sensing unit group 331 having two rows and two columns are located at a geometric center of a sensing unit group 332 having four rows and four columns, and a plurality of sensing unit groups 332 having four rows and four columns constitute the target image sensor. In the colored sensing unit group 331 having two rows and two columns, a ratio between cyan sensing units, yellow sensing units, and magenta sensing units is 1:1:2. The cyan sensing unit and the yellow sensing unit are distributed in a main diagonal, and are respectively located at an upper left corner and a lower right corner of the colored sensing unit group 331 having two rows and two columns. The two magenta sensing units are distributed in a secondary diagonal, and are respectively located at an upper right corner and a lower left corner of the colored sensing unit group 331 having two rows and two columns.

It should be understood that the cyan sensing unit, the magenta sensing unit, and the yellow sensing unit in the target image sensor may alternatively be arranged in another manner. This is not limited in this embodiment of this application. In this embodiment and the following embodiments, only an example in which the color filter layer in the target image sensor is the CMYW color filter layer is used for description.

Optionally, the target image sensor may be a CCD image sensor including a charged coupled device (CCD), or may be a CMOS image sensor including a complementary metal oxide semiconductor (CMOS). This is not specifically limited herein. When the target image sensor is the CMOS image sensor, sensitivity of the target image sensor to infrared light is higher than that of the CCD image sensor, so that the target image sensor can record more details of a photographed object.

In addition, a structure of the foregoing target image sensor may be an orthographic structure (also referred to as a surface-illuminated structure), or may be a back-illuminated structure. This is not specifically limited herein.

Figure 4:
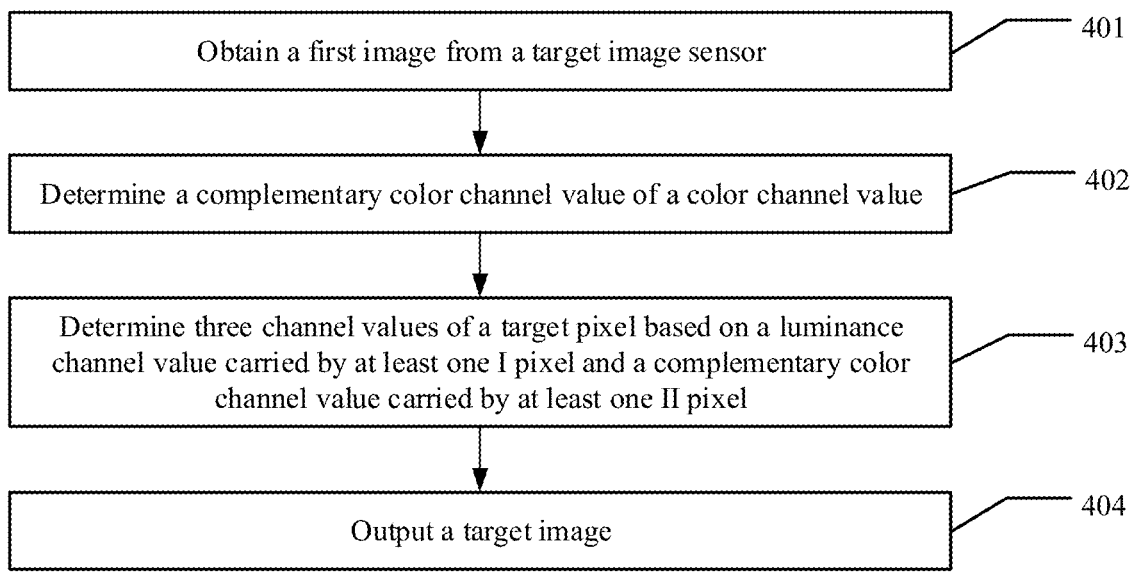
FIG. 4 is a flowchart of an image processing method according to an embodiment of this application.

The following describes a main procedure of the image processing method in the embodiments of this application. As shown in FIG. 4, the image processing apparatus performs the following steps.

401: Obtain a first image from the target image sensor.

In this embodiment, the image processing apparatus may obtain the first image from the target image sensor. The first image carries luminance information and color information that are recorded by the target image sensor. Specifically, the first image includes an I pixel and an II pixel. A set of I pixels in the first image is referred to as an I pixel group, and a set of II pixels in the first image is referred to as an II pixel group. The I pixel group and the II pixel group do not overlap in locations. The I pixel group includes a plurality of I pixels, each I pixel in the I pixel group carries one luminance channel value, and the I pixel may also be referred to as a luminance pixel. The II pixel group includes a plurality of II pixels, each II pixel in the II pixel group carries one color channel value, and the II pixel may also be referred to as a color pixel. In addition, because the first image is obtained after the first image is processed by the target image sensor but not processed by a component such as a digital signal processor (DSP), the first image may be referred to as an original image.

In addition, both the I pixel and the II pixel are single-channel pixels. The single-channel pixel means that the pixel carries only one channel value, and another channel value of the pixel is missing. For example, the foregoing I pixel carries only one luminance channel value, and three color channel values of the I pixel are missing. For another example, the foregoing II pixel carries one color channel value, and the remaining two color channel values and a luminance channel value of the II pixel are missing. For example, a cyan pixel has only a cyan channel value, but does not have a luminance channel value and another color channel value. For ease of understanding, the arrangement manner 1 in FIG. 3A is used as an example for description. When a colored sensing unit (a shadowed unit) and a colorless sensing unit (a shadowless unit) in the target image sensor are arranged in the arrangement manner 1, the plurality of I pixels and the plurality of II pixels in the first image obtained by the image processing apparatus are also arranged in the arrangement manner 1. In this case, in the arrangement manner 1 in FIG. 3A, a shadowless unit represents an I pixel, and a shadowed unit represents an II pixel. Similarly, when a colored sensing unit (a shadowed unit) and a colorless sensing unit (a shadowless unit) in the target image sensor are arranged in the arrangement manner 2, the arrangement manner 3, or the arrangement manner 4 in FIG. 3A, the plurality of I pixels and the plurality of II pixels in the first image obtained by the image processing apparatus are also accordingly arranged in the arrangement manner 2, the arrangement manner 3, or the arrangement manner 4.

Further, a color channel corresponding to the color channel value includes one of a cyan channel, a magenta channel, or a yellow channel. Therefore, a specific II pixel in the foregoing II pixel group may carry only one cyan channel value (in this case, the II pixel may be referred to as a cyan pixel), or carry only one magenta channel value (in this case, the II pixel may be referred to as a magenta pixel), or carry only one yellow channel value (in this case, the II pixel may be referred to as a yellow pixel). The foregoing II pixel group includes an II pixel that carries a cyan channel value, an II pixel that carries a magenta channel value, and an II pixel that carries a yellow channel value. A manner of arranging a cyan pixel, a magenta pixel, and a yellow pixel corresponds to the foregoing manner of arranging a cyan sensing unit, a magenta sensing unit, and a yellow sensing unit in the target image sensor. For ease of understanding, FIG. 3B is used as an example for description. A unit without a letter represents an I pixel having only a luminance channel value, and a unit with a letter (for example, "C", "M", or "Y") represents an II pixel having only a color channel value. Herein, "C" indicates an II pixel having only a cyan channel value, "M" indicates an II pixel having only a magenta channel value, and "Y" indicates an II pixel having only a yellow channel value.

It should be understood that luminance channel values carried by the I pixels in the foregoing I pixel group are not all the same, and color channel values carried by the II pixels in the foregoing II pixel group are not all the same. This is not specifically limited herein.

It should be further understood that the I pixel group is obtained by a colorless sensing unit group in the target image sensor by recording light, and the II pixel group is obtained by a colored sensing unit group in the target image sensor by recording light of a color corresponding to a color filter layer of the colored sensing unit group. Therefore, for a same shooting scenario, different target image sensors output different first images. For a manner of arranging a plurality of colorless sensing units and a plurality of colored sensing units in the target image sensor, refer to related descriptions in the embodiment corresponding to FIG. 3A. Details are not described herein again.

402: Determine a complementary color channel value of the color channel value.

In an optional implementation, after supplementing the missing color channel values of the foregoing II pixel, the image processing apparatus may replace the three color channel values of the II pixel with complementary color channel values. For example, if a specific II pixel has only a cyan channel value, the image processing apparatus first determines a magenta channel value and a yellow channel value of the II pixel, and then converts the foregoing three color channel values into complementary color channel values.

In another optional implementation, the image processing apparatus may directly convert each color channel value in the first image into a complementary color channel value, and then supplement the remaining complementary color channel values of the II pixel. For example, if a specific II pixel has only a cyan channel value, the image processing apparatus first converts the cyan channel value of the II pixel into a magenta channel value, and then determines a green channel and a blue channel value of the II pixel.

In the foregoing two implementations, a color channel corresponding to the complementary color channel value includes one of a red channel, a green channel, or a blue channel. It can also be understood that a red channel value may be determined based on the cyan channel value, a green channel value may be determined based on the magenta channel value, and a blue channel value may be determined based on the yellow channel value.

403: Determine three channel values of a target pixel based on a luminance channel value carried by at least one I pixel and a complementary color channel value carried by at least one II pixel.

In this embodiment, a pixel (for example, an I pixel or an II pixel) further has location information in addition to a channel value. The target pixel is at a same location as one I pixel, or is at a same location as one II pixel.

In this embodiment, the image processing apparatus may determine a luminance channel value of the II pixel in the first image based on the luminance channel values carried by the one or more I pixels, and the image processing apparatus may simultaneously determine a complementary color channel value of the I pixel based on the complementary color channel values carried by the one or more II pixels. In this case, each I pixel in the foregoing I pixel group can reflect a color based on three complementary color channel values, and each II pixel in the foregoing II pixel group can reflect luminance based on a luminance channel value.

The image processing apparatus may determine the target pixel based on luminance of the foregoing I pixel group and colors of the foregoing II pixel group. The target pixel includes the three channel values. The three channel values are a red (R) channel, a green (G) channel, and a blue (B) channel. The three channel values of the target pixel are used to indicate a color and luminance of the target pixel. A process of determining the three channel values of the target pixel is, for example, as follows: For the target pixel, the three RGB channel values (without luminance information) of the target pixel are adjusted by using a luminance channel value of the target pixel, to obtain three adjusted RGB channel values. An adjusted target pixel further has luminance information in addition to color information.

Specifically, after the luminance channel value of the target pixel and the three color channel values of the target pixel are obtained, luminance-color fusion is performed to obtain fused color channel values of the target pixel. A target image has rich colors.

404: Output the target image.

In this embodiment, after the image processing apparatus determines the target pixel, the image processing apparatus may output the target image having the target pixel.

Further, by using the method in step 403, three channel values of each of all the I pixels and all the II pixels may be obtained, so that color-luminance fusion is performed on each pixel in the obtained target image. In the target image, three channel values of each pixel are not exactly the same. Therefore, luminance and colors presented by the pixels in the target image are not exactly the same. Therefore, the target image that is output by the image processing apparatus may present rich colors and sharp details.

In this embodiment, each I pixel in the I pixel group in the first image obtained by the image processing apparatus from the target image sensor carries the luminance channel value, so that details of the target image that is output by the image processing apparatus are sharp. In addition, each II pixel in the II pixel group in the first image carries the color channel value, so that the target image that is output by the image processing apparatus has colors. Then, the target image is determined based on the foregoing I pixel group and the foregoing II pixel group, so that the foregoing image colors and the foregoing image details are fused to obtain the sharp target image with rich colors. In addition, in this solution, one image from one image sensor instead of two image sensors is processed, and a time-sharing system does not need to be set. This helps simplify an internal system of the image processing apparatus. It should be specially noted that the target image sensor in this embodiment of the present invention uses a CMYW color filter layer. A light sensitivity effect of the CMYW color filter layer is better than that of an RGB color filter layer. Therefore, quality of an output image is higher, and the target image has more color information and is easier to be recognized.

Figure 5:
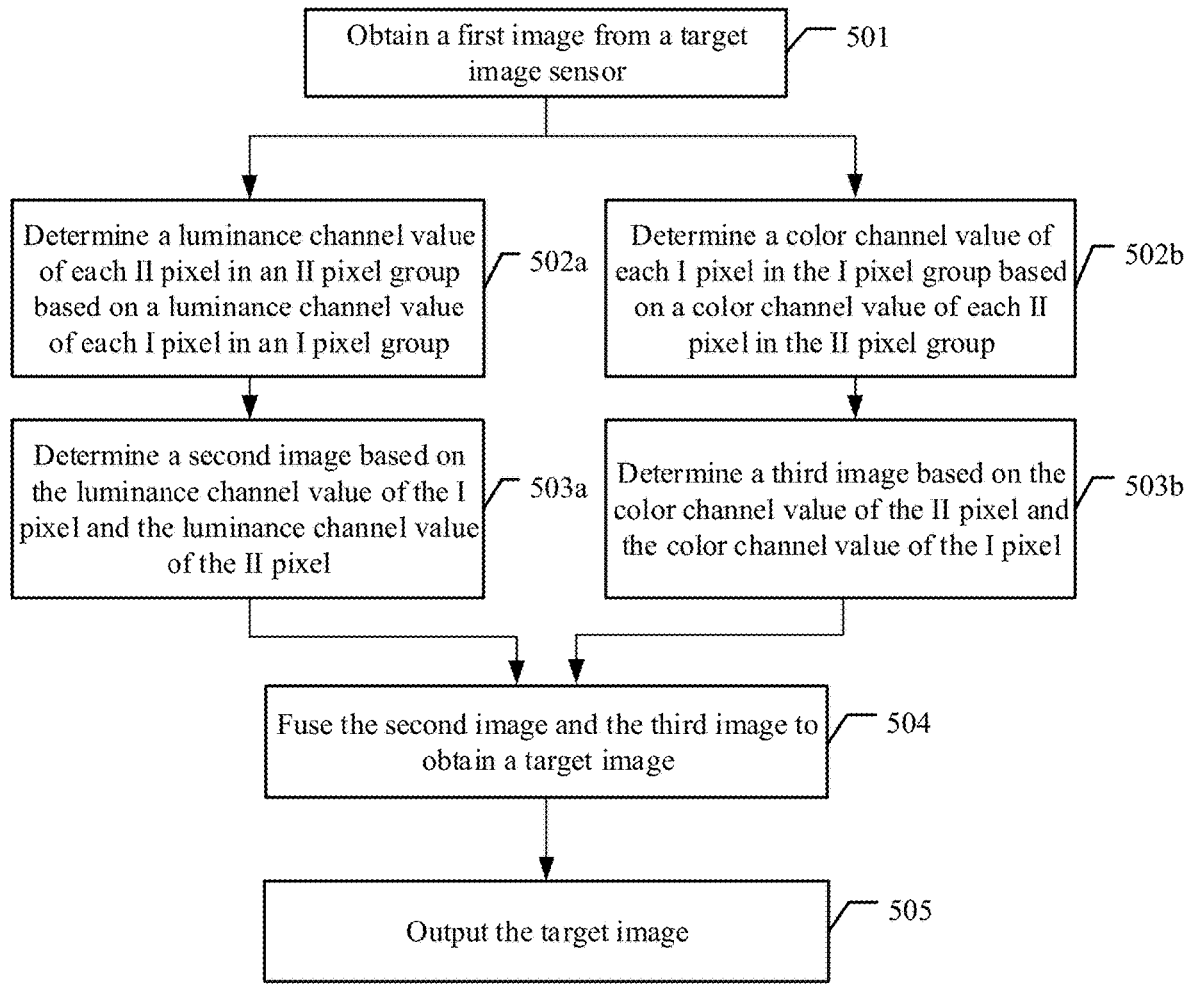
FIG. 5 is another flowchart of an image processing method according to an embodiment of this application.

The following further describes the image processing method based on the foregoing target image sensor. As shown in FIG. 5, the image processing apparatus performs the following steps.

501: Obtain a first image from the target image sensor.

The first image (original image) includes an I pixel group and an II pixel group, and the I pixel group and the II pixel group do not overlap in locations. The I pixel group includes a plurality of I pixels, and each I pixel in the I pixel group carries one luminance channel value. The II pixel group includes a plurality of II pixels, and each II pixel in the II pixel group carries one color channel value. Specifically, refer to related descriptions in step 401. Details are not described herein again.

In this embodiment, after obtaining the first image from the target image sensor, the image processing apparatus separately processes the I pixel group and the II pixel group in the first image. Specifically, the image processing apparatus separately performs step 502*a* and step 502*b*.

502*a*: Determine a luminance channel value of each II pixel in the II pixel group based on the luminance channel value of each I pixel in the I pixel group.

In this embodiment, it can be learned based on the foregoing target image sensor that a colored sensing unit in the target image sensor is adjacent to at least one colorless sensing unit. Therefore, in the first image, an II pixel is adjacent to or close to at least one I pixel, and the I pixel group and the II pixel group do not overlap. In this case, because the at least one I pixel around the II pixel carries a luminance channel value, a luminance channel value of the II pixel may be determined based on the luminance channel value of the at least one I pixel. By analogy, the luminance channel value of each II pixel in the II pixel group is determined based on the luminance channel value of each I pixel in the I pixel group.

Specifically, the image processing apparatus may determine the luminance channel value of the II pixel based on the luminance channel value of the one or more I pixels around the II pixel. Certainly, if the colorless sensing units and the colored sensing units in the foregoing target image sensor are arranged in different manners, locations of the I pixels and the II pixels in the first image are also different. Further, different quantities of I pixels are around the II pixel.

For example, when the sensing units in the target image sensor are arranged in the arrangement manner 1 in FIG. 3A, the I pixels and the II pixels in the first image are also arranged in the arrangement manner 1 in FIG. 3A. In this case, a shadowed unit in the arrangement manner 1 represents an II pixel, and a shadowless unit in the arrangement manner 1 represents an I pixel. Specifically, the image processing apparatus may determine an I pixel value of the II pixel based on initial pixel values of four I pixels around the II pixel, initial pixel values of eight I pixels around the II pixel, or initial pixel values of sixteen I pixels around the II pixel.

Figure 6A:
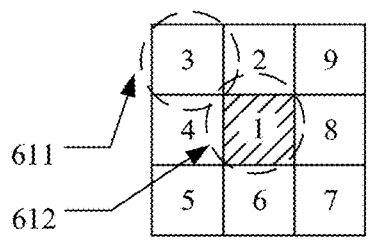
FIG. 6A is a schematic diagram of an embodiment of an image processing method according to an embodiment of this application.
Figure 6B:
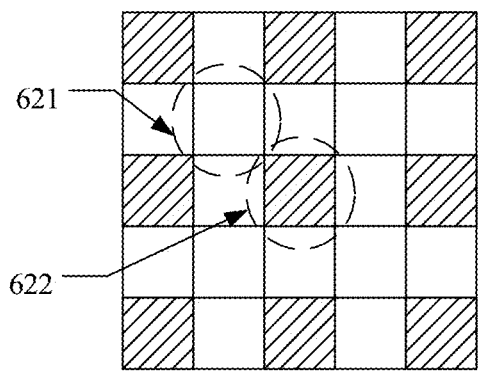
FIG. 6B is a schematic diagram of another embodiment of an image processing method according to an embodiment of this application.

For ease of understanding, some pixels in the first image are used for description with reference to FIG. 6A and FIG. 6B.

As shown in FIG. 6A, a rectangle having three rows and three columns in the first image is used as an example for description. The rectangle includes one II pixel and eight I pixels. A shadowed pixel is an II pixel, for example, a pixel 612; and a shadowless pixel is an I pixel, for example, a pixel 611. For ease of describing an orientation relationship between the pixels in FIG. 6A, a number of a location of each pixel is recorded counterclockwise by using a location of the II pixel as a center. For example, the location of the II pixel is numbered 1, a location of an I pixel directly above the II pixel is numbered 2, a location of an I pixel on the upper left of the II pixel is numbered 3, a location of an I pixel on the left of the II pixel is numbered 4, a location of an I pixel on the lower left of the II pixel is numbered 5, a location of an I pixel below the II pixel is numbered 6, a location of an I pixel on the lower right of the II pixel is numbered 7, a location of an I pixel on the right of the II pixel is numbered 8, and a location of an I pixel on the upper right of the II pixel is numbered 9. However, it should be understood that the foregoing number is merely used for ease of description below, and is not a limitation on the I pixel or the II pixel.

According to the arrangement manner in FIG. 6A, when the image processing apparatus determines a luminance channel value of the II pixel based on luminance channel values of the four I pixels around the II pixel, the image processing apparatus may determine the luminance channel value of the II pixel based on luminance channel values of the I pixels 2, 4, 6, and 8. A specific determining method is, for example, obtaining an average value (or a weighted average value) of the luminance channel values of the four I pixels, or performing convolution calculation on the luminance channel values of the four I pixels. Alternatively, the image processing apparatus may determine the luminance channel value of the II pixel based on luminance channel values of the I pixels 3, 5, 7, and 9. This is not specifically limited herein. When the image processing apparatus determines the luminance channel value of the II pixel based on luminance channel values of the eight I pixels around the II pixel, the image processing apparatus may determine the luminance channel value of the II pixel based on the luminance channel values of the I pixels 2 to 9. This is not specifically limited herein.

The following describes a concept "around" in this embodiment of the present invention. One pixel around another pixel may be a pixel adjacent to the another pixel, or a pixel whose distance to the another pixel is within N pixels, where N is an integer. For example, in FIG. 6A, pixels adjacent to the pixel 1 are the pixel 2, the pixel 3, the pixel 4, the pixel 5, the pixel 6, the pixel 7, the pixel 8, and the pixel 9; a distance between the pixel 1 and each of these pixels is one pixel; and the pixel 1, the pixel 2, and the pixel 4 are pixels whose distances to the pixel 5 each are within two pixels. Another explanation is that a pixel whose distance to a target pixel is within a preset range is a pixel around the target pixel. For example, a pixel in a circle for which a center is the target pixel and a radius is several pixels is a pixel around the target pixel, or the first several pixels in the circle may be selected as pixels around the target pixel. In this embodiment of the present invention, luminance channel values of some or all of pixels around the pixel 2 are selected to obtain the luminance channel value of the pixel 2 through calculation.

In addition, as shown in FIG. 6B, a pixel group having five rows and five columns in the first image is used as an example for description. The pixel group includes nine II pixels and sixteen I pixels. A shadowed pixel is an II pixel, for example, a pixel 622; and a shadowless pixel is an I pixel, for example, a pixel 621. In this case, the image processing apparatus may determine a luminance channel value of the II pixel based on initial pixel values of the sixteen I pixels around the II pixel.

It should be understood that a manner in which the image processing apparatus determines a luminance channel value of an II pixel based on luminance channel values of a plurality of I pixels is not limited to the foregoing example, and may be adjusted as required during actual application.

According to the foregoing implementation, the image processing apparatus may further calculate the luminance channel value of the II pixel based on the luminance channel values of the plurality of I pixels in the I pixel group and a preset correspondence through a convolution operation. Optionally, the preset correspondence is a preset convolution kernel.

Further, the image processing apparatus may perform a convolution operation on the plurality of luminance channel values by using the preset convolution kernel, to obtain a plurality of first interpolation weights. Then, the image processing apparatus performs weighted summation based on the plurality of interpolation weights and luminance channel values of I pixels corresponding to the first interpolation weights, to obtain the luminance channel value of the II pixel.

For example, FIG. 6A is used as an example for description. Each I pixel in FIG. 6A includes one luminance channel value. For ease of description below, the luminance channel value of the I pixel 2 is recorded as V2, and the luminance channel value of the I pixel 3 is recorded as V3. By analogy, the luminance channel value of the I pixel 9 is recorded as V9. The to-be-determined luminance channel value of the II pixel is V1.

First, the image processing apparatus calculates a first interpolation weight in each direction by using a preset convolution kernel. The preset convolution kernel may be one or more convolution kernels.

For example, the image processing apparatus performs convolution on the II pixel by using the luminance channel value of the I pixel 8 and convolution kernels $$\begin{pmatrix} 0 & 0 & 0 \\ -1 & 0 & 1 \\ 0 & 0 & 0 \end{pmatrix}$$

and $$\begin{pmatrix} 0 & 0 & 0 \\ 0 & -1 & 1 \\ 0 & 0 & 0 \end{pmatrix},$$

to obtain edge strength on the right of the II pixel (edge strength in a 0-degree direction): E8_1 and E8_2. In this case, an interpolation weight of the I pixel 8 is:

$$W_8 = 1 / \sqrt{1 + \alpha(|E8\_1| + |E8\_2|)}.$$

For another example, the image processing apparatus performs convolution on the II pixel by using the luminance channel value of the I pixel 4 and convolution kernels $$\begin{pmatrix} 0 & 0 & 0 \\ 1 & 0 & -1 \\ 0 & 0 & 0 \end{pmatrix}$$

and $$\begin{pmatrix} 0 & 0 & 0 \\ 1 & -1 & 0 \\ 0 & 0 & 0 \end{pmatrix},$$

to obtain edge strength on the left of the II pixel (edge strength in a 180-degree direction): E4_1 and E4_2. In this case, an interpolation weight of the I pixel 4 is:

$$W_4 = 1 / \sqrt{1 + \alpha(|E4\_1| + |E4\_2|)}.$$

By analogy, edge strength of the II pixel in each direction and a first interpolation weight corresponding to the edge strength may be calculated. Then, the image processing apparatus calculates the luminance channel value of the II pixel:

$$V1 = \frac{\sum_{i=2}^{9} V_i g W_i}{\sum_{i=2}^{9} W_i}.$$

It should be understood that, in addition to the foregoing interpolation algorithm, the image processing apparatus may further perform processing by using another interpolation algorithm. This is not specifically limited herein.

502*b*: Determine a color channel value of each I pixel in the I pixel group based on the color channel value of each II pixel in the II pixel group.

In this embodiment, it can be learned from the foregoing descriptions that an II pixel in the first image is adjacent to at least one I pixel, and no pixel in the I pixel group overlaps a pixel in the II pixel group in locations. Therefore, it may be determined that one or more II pixels are also around an I pixel in the first image, so that a color channel value of the I pixel can be determined based on color channel values of the one or more II pixels.

In an optional implementation, the image processing apparatus may first determine a missing color channel value of a first II pixel in the II pixel group based on color channel values of one or more II pixels around the first II pixel in the II pixel group. Then, the image processing apparatus determines three missing color channel values of an I pixel in the I pixel group based on the three color channel values of each of the one or more II pixels.

Figure 6C:
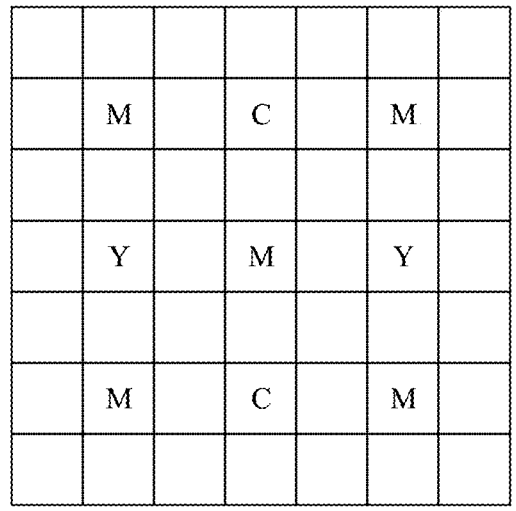
FIG. 6C is a schematic diagram of another embodiment of an image processing method according to an embodiment of this application.
Figures 1, 6D:
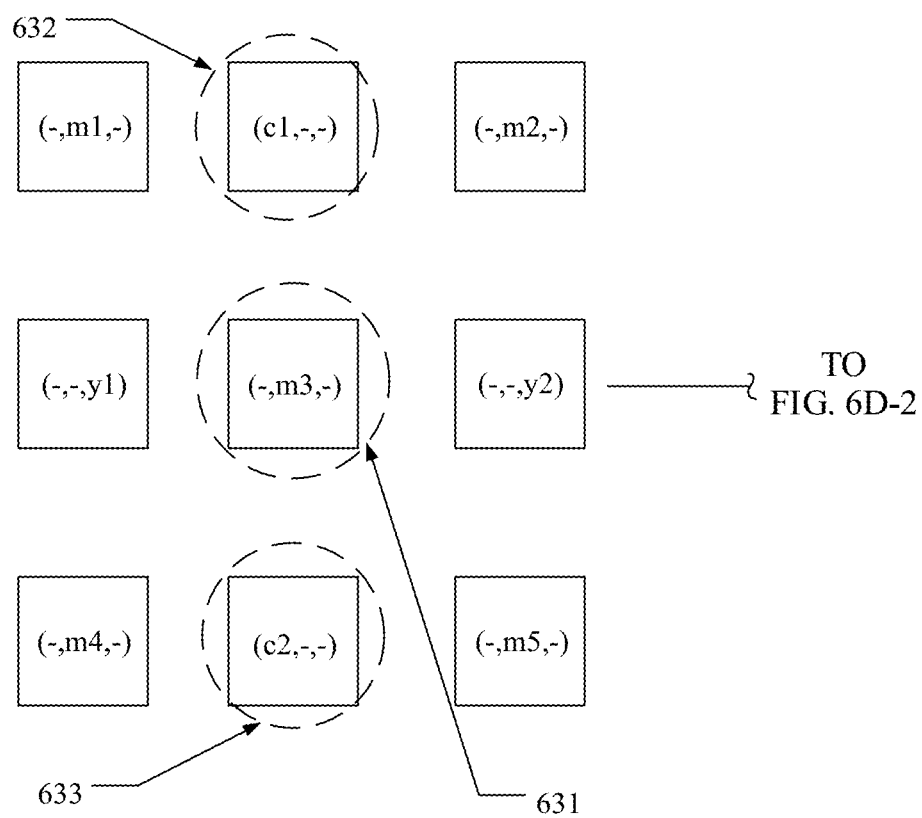

For ease of understanding, as shown in FIG. 6C, a pixel group having seven rows and seven columns in the first image is used as an example for description. Herein, "M" indicates an II pixel having only a magenta channel value, "C" indicates an II pixel having only a cyan channel value, and "Y" indicates an II pixel having only a yellow channel value. In this case, II pixels in the pixel group having seven rows and seven columns may be further represented in FIG. 6D-1. For ease of description, FIG. 6D-1 and FIG. 6D-2 omit an I pixel and show only an II pixel. A pixel 631 represents an II pixel that is located at a geometric center and that has only a magenta channel value, the magenta channel value of the II pixel is m3, and the remaining color channel values and a luminance channel value are missing. Similarly, a pixel 632 represents an II pixel having only a cyan channel value, the cyan channel value of the II pixel is c1, and the remaining color channel values and a luminance channel value are missing. Other pixels are deduced by analogy. Details are not described again.

Based on the foregoing example, because the cyan channel value of the pixel 631 is missing, and the pixel 632 located directly above the pixel 631 and a pixel 633 located directly below the pixel 631 respectively carry cyan channel values c1 and c2, the image processing apparatus may determine the cyan channel value of the pixel 631 based on the cyan channel value c1 of the pixel 632 and the cyan channel value c2 of the pixel 633. For example, it can be learned from FIG. 6D-2 that a new pixel 634 may be determined. That the pixel 634 carries a cyan channel value c3 is determined based on the cyan channel value c1 and the cyan channel value c2. By analogy, the image processing apparatus may determine each color channel value of each II pixel, for example, as shown in FIG. 6E. In addition, the image processing apparatus may further determine a color channel value of an I pixel according to a similar method.

Figure 6F:
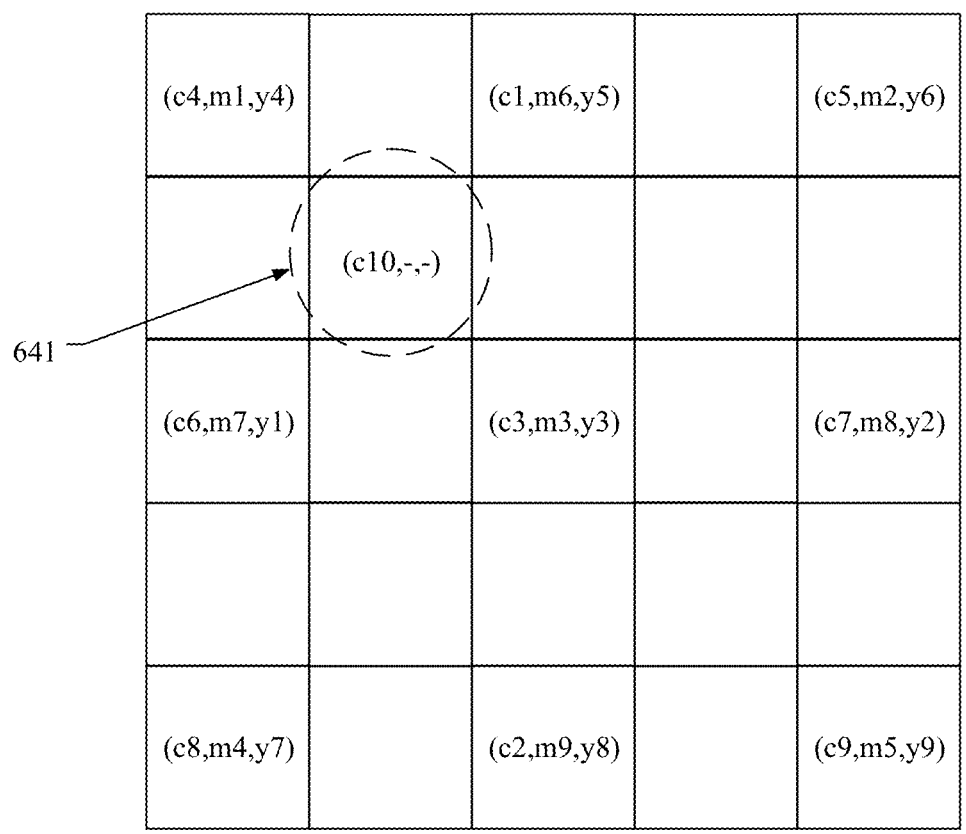
FIG. 6F is a schematic diagram of another embodiment of an image processing method according to an embodiment of this application.

FIG. 6F is used as an example. FIG. 6F includes an I pixel omitted in FIG. 6D-1 and FIG. 6D-2 and an II pixel shown in FIG. 6D-1 and FIG. 6D-2. It should be understood that a luminance channel value may be processed by using another processing thread of the image processing apparatus. Therefore, FIG. 6F does not show a luminance channel value of an I pixel. The image processing apparatus needs to determine a color channel value of the I pixel based on a color channel value of an II pixel. For example, when the image processing apparatus needs to determine a color channel value of a pixel 641, the image processing apparatus may determine a cyan channel value of the pixel 641 based on cyan channel values of II pixels located at four top corners of the pixel 641, for example, determine the cyan channel value of the pixel 641 based on one or more of a cyan channel value c4, a cyan channel value c1, a cyan channel value c6, and a cyan channel value c3. Similarly, the image processing apparatus may determine another color channel value of the I pixel. For example, as shown in FIG. 6G, each pixel in a pixel group having five rows and five columns has three color channel values.

In another optional implementation, the image processing apparatus may first determine three color channel values of one II pixel based on different color channel values of at least one II pixel. Specifically, the image processing apparatus may determine a cyan channel value of a second II pixel based on one or more of a cyan channel value, a magenta channel value, or a yellow channel value of an II pixel around the second II pixel; the image processing apparatus may determine a magenta channel value of the second II pixel based on one or more of the cyan channel value, the magenta channel value, or the yellow channel value of the II pixel around the second II pixel; and the image processing apparatus may determine a yellow channel value of the second II pixel based on one or more of the cyan channel value, the magenta channel value, or the yellow channel value of the II pixel around the second II pixel.

Figure 6H:
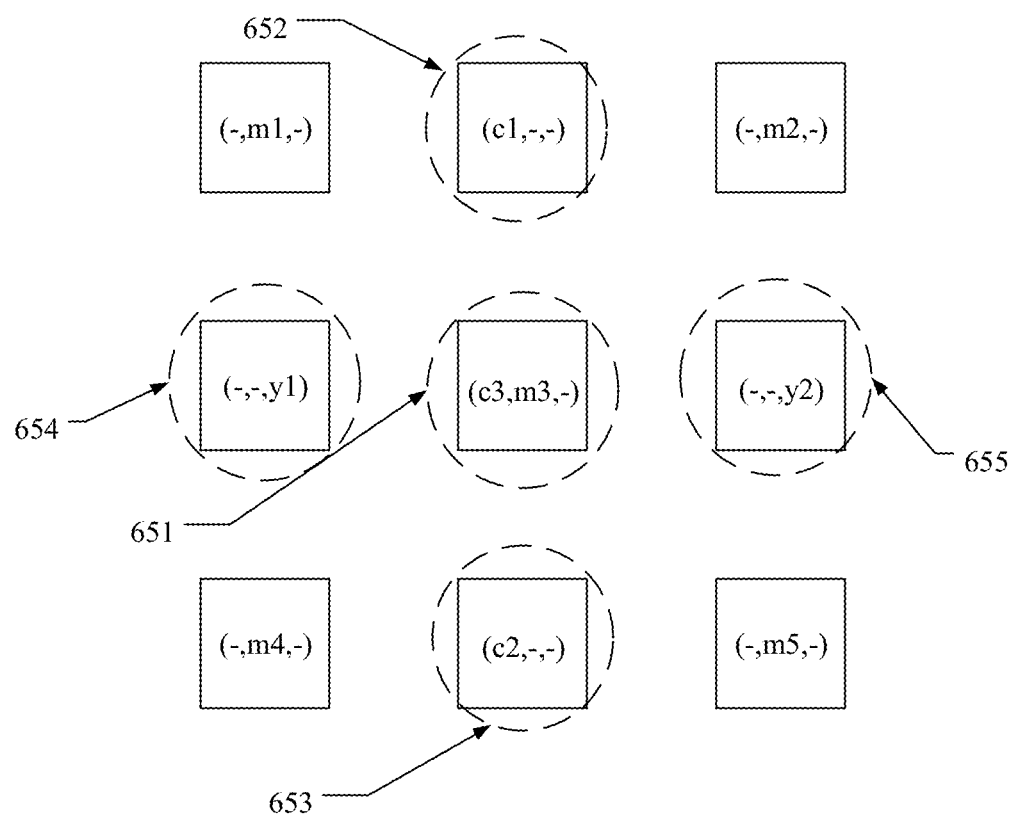
FIG. 6H is a schematic diagram of another embodiment of an image processing method according to an embodiment of this application.

For ease of understanding, nine II pixels in the first image are used as an example for description. As shown in FIG. 6H, the image processing apparatus may determine a cyan channel value of a pixel 651 based on a cyan channel value c1 of a pixel 652 and a cyan channel value c2 of a pixel 653, or based on a yellow channel value y1 of a pixel 654 and a yellow channel value y2 of a pixel 655, or based on the cyan channel value c1 of the pixel 652 and the yellow channel value y1 of the pixel 654. Similarly, the image processing apparatus may alternatively determine the cyan channel value of the pixel 651 based on another color channel value, so that a color reflected by the determined color channel value is more realistic.

It should be understood that FIG. 6C to FIG. 6H in this step are merely examples enumerated for ease of description. Specifically, the image processing method in this embodiment is not limited to the arrangement manners in FIG. 6C to FIG. 6H.

It should be understood that a time sequence of performing step 502a and step 502b is not limited. It can also be understood that the image processing apparatus may perform step 502a before step 502b, or the image processing apparatus may perform step 502b before step 502a, or the image processing apparatus may simultaneously perform step 502a and step 502b. This is not specifically limited herein.

503a: Determine a second image based on the luminance channel value of the I pixel and the luminance channel value of the II pixel.

In this embodiment, step 503a is optional. After the image processing apparatus performs step 502a, the image processing apparatus may perform step 503a.

In this implementation, luminance presented by the I pixel and luminance presented by the II pixel are respectively provided by the luminance channel value of the I pixel and the luminance channel value of the II pixel. Therefore, when the luminance channel value of the I pixel and the luminance channel value of the II pixel in the first image are determined, the image processing apparatus may determine the second image.

Figures 6I, 6J:
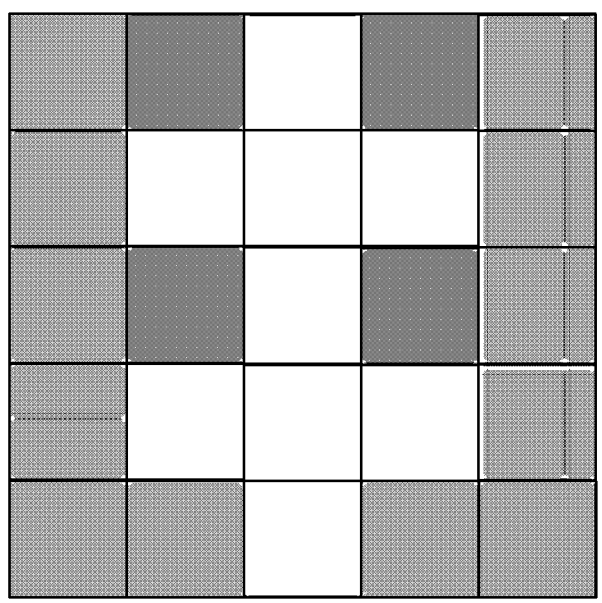
FIG. 6I is a schematic diagram of another embodiment of an image processing method according to an embodiment of this application.
FIG. 6J is a schematic diagram of another embodiment of an image processing method according to an embodiment of this application.

It can also be understood that the second image includes the I pixel and the II pixel, and both the luminance of the I pixel and the luminance of the II pixel are described by the respective luminance channel values. Each pixel in the second image may reflect luminance (not reflect a color). It can be understood that the second image is a gray-scale image presenting different luminance. For example, FIG. 6I shows distribution of a luminance channel value of each pixel in the second image. When an output of the image processing apparatus is shown in FIG. 6I, a gray-scale image shown in FIG. 6J may be presented. It should be understood that FIG. 6I and FIG. 6J are two different forms of the second image. A specific form of the second image is not limited in this embodiment.

Optionally, a quantity of I pixels in the second image is equal to a quantity of I pixels in the first image, and a quantity of II pixels in the second image is equal to a quantity of II pixels in the first image.

503b: Determine a third image based on the color channel value of the II pixel and the color channel value of the I pixel.

In this embodiment, step 503b is optional. After the image processing apparatus performs step 502b, the image processing apparatus may perform step 503b.

Optionally, that the image processing apparatus determines a complementary color channel value of the foregoing color channel value may also be understood as that the image processing apparatus converts the color channel value of the I pixel into a corresponding complementary color channel value, and converts the color channel value of the II pixel into a corresponding complementary color channel value. Then, the image processing apparatus determines the third image based on the complementary color channel value of the II pixel and the complementary color channel value of the I pixel. The third image includes the I pixel and the II pixel. Each pixel in the third image may reflect a color (not reflect luminance), and the pixels in the third image present different colors.

Figure 6M:
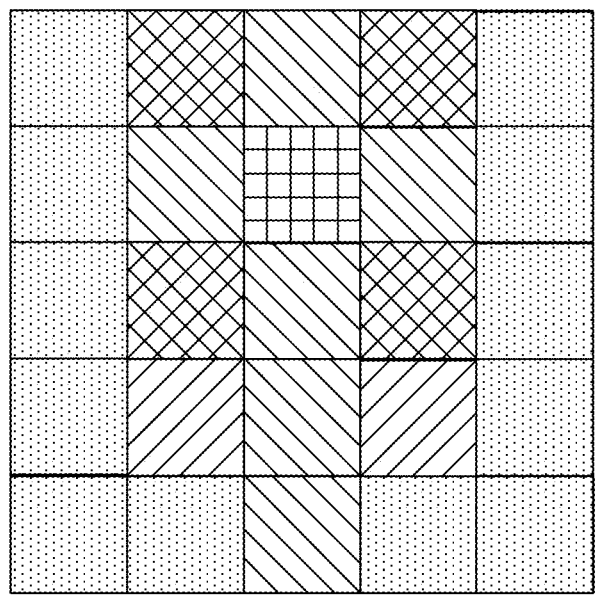
FIG. 6M is a schematic diagram of another embodiment of an image processing method according to an embodiment of this application.

For example, FIG. 6K shows distribution of three color channel values of each pixel, where "C" represents a cyan channel value, m represents a magenta channel value, and y represents a yellow channel value. As shown in FIG. 6L, the foregoing different color channel values are converted into corresponding complementary color channel values, where "R" represents a red channel value, g represents a green channel value, and "B" represents a blue channel value. It can be understood that FIG. 6L shows distribution of a complementary color channel value of each pixel in the third image. When the image processing apparatus outputs FIG. 6L, an image including color information shown in FIG. 6M may be presented. Different shadow textures represent different colors. It should be understood that FIG. 6L and FIG. 6M are two different forms of the third image. A specific form of the third image is not limited in this embodiment.

Optionally, a quantity of I pixels in the third image is equal to a quantity of I pixels in the first image, and a quantity of II pixels in the third image is equal to a quantity of II pixels in the first image.

504: Fuse the second image and the third image to obtain a target image.

The second image carries the luminance channel value of the I pixel and the luminance channel value of the II pixel. It can also be understood that the second image includes each I pixel in the I pixel group and each II pixel in the II pixel group, and each pixel in the second image has a luminance channel value but does not have a color channel. The third image carries the three complementary color channel values of the II pixel and the three complementary color channel values of the I pixel. It can also be understood that the third image includes each I pixel in the I pixel group and each II pixel in the II pixel group, and each pixel in the third image has three complementary color channels but does not have a luminance channel.

Figure 6N:
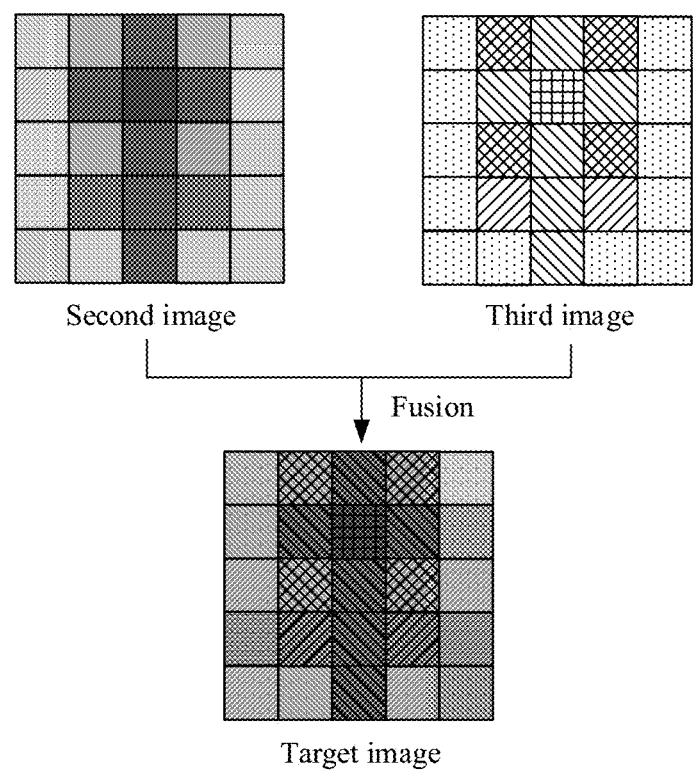
FIG. 6N is a schematic diagram of another embodiment of an image processing method according to an embodiment of this application.

In this embodiment, because the foregoing second image carries only a luminance channel value, only luminance can be reflected and a color cannot be reflected; and because the foregoing third image carries only a color channel value, only a color can be reflected and luminance cannot be reflected. Therefore, the image processing apparatus needs to fuse the second image and the third image to determine the target image. For example, the second image shown in FIG. 6J and the third image shown in FIG. 6M may be fused to obtain the target image shown in FIG. 6N.

The image fusion may be understood as fusion of pixels in an image. For a target pixel, the image processing apparatus fuses a luminance channel value of a target pixel in the second image and a color channel value of a target pixel in the third image to obtain a fused target pixel. The target pixel includes three channel values (for example, three color channels). The three channel values of the target pixel are used to indicate a color and luminance of the target pixel. Therefore, a plurality of target pixels are combined into the foregoing target image.

The target pixel may be any I pixel or any II pixel. According to this method, three channel values of each of a plurality of pixels may be obtained after fusion. In this embodiment, each pixel in the target image carries luminance information and color information. Therefore, the target image may reflect color and luminance distribution of light recorded by the target image sensor.

505: Output the target image.

In this embodiment, the image processing apparatus may output the target image. The target image includes the foregoing target pixel. Because the three channel values of the target pixel are not exactly the same, luminance and colors presented by each of the plurality of target pixels are not exactly the same. Therefore, the target image that is output by the image processing apparatus may present rich colors.

In addition, by performing the foregoing steps, because the target pixel is any I pixel or any II pixel, according to the method, processing in the foregoing steps may be performed on a plurality of pixels (or all pixels) in the first image, so as to generate the target image, so that the target image can present rich colors and sharp details.

In this embodiment, each I pixel in the I pixel group in the first image obtained by the image processing apparatus from the target image sensor carries the luminance channel value, and the luminance channel value of the II pixel may be determined based on the luminance channel value of the I pixel, so that each pixel determined by the image processing apparatus carries luminance. In addition, each II pixel in the II pixel group in the first image carries the color channel value, and the color channel value of the I pixel may be determined based on the color channel value of the II pixel, so that each pixel determined by the image processing apparatus has a color. Then, the pixels are determined based on the luminance channel values of the foregoing I pixel group and the foregoing II pixel group and the color channel colors of the foregoing I pixel group and the foregoing II pixel group, and the target image is output, so that the foregoing image colors and the foregoing image luminance details are fused to obtain the sharp target image with rich colors. In addition, in this solution, one image from one image sensor instead of two image sensors is processed, and a time-sharing system does not need to be set. This helps simplify an internal system of the image processing apparatus. In addition, in this embodiment of the present invention, a CMYW image (the first image) may be processed, and an obtained image has better image quality than an image obtained by processing an RGB image.

Figure 7:
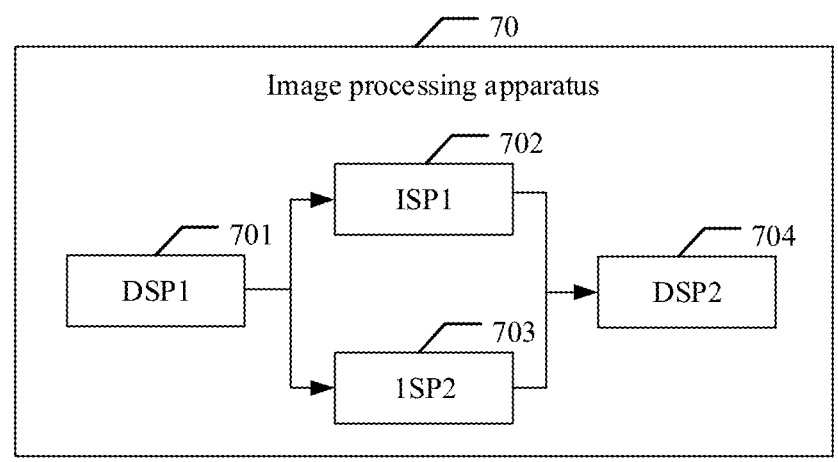
FIG. 7 is a schematic diagram of an embodiment of an image processing apparatus according to an embodiment of this application.

FIG. 7 is an optional structure of an image processing apparatus 70 according to an embodiment of this application. The image processing apparatus 70 may be a function unit or a system on a chip (SoC) in a photographing apparatus. The image processing apparatus 70 includes:

a DSP1 701, a DSP2 704, an ISP1 702, and an ISP2 703, where the DSP1 701 and the DSP2 704 each are a digital signal processor (DSP), that is, a microprocessor dedicated to digital signal processing, including a central processing unit (CPU) or an arithmetic and logic unit (ALU); and the ISP1 702 and the ISP2 703 each are an image signal processor (ISP), that is, a pipelined image processing dedicated engine that may process an image signal at a high speed, including dedicated circuits such as auto exposure and automatic white balance, so as to implement corresponding circuit functions.

Optionally, the image processing apparatus 70 may use the ISP1 and the ISP2, or the ISP1 and the ISP2 are disposed outside the image processing apparatus 70.

In this embodiment, the DSP1 701 is configured to obtain a first image from a target image sensor. The DSP1 701 is further configured to: determine a luminance channel value of each II pixel in an II pixel group based on a luminance channel value of each I pixel in an I pixel group, and determine a color channel value of each I pixel in the I pixel group based on a color channel value of each II pixel in the II pixel group.

The ISP1 702 is configured to determine a second image based on the luminance channel value of the I pixel that is output by the DSP1 701 and the luminance channel value of the II pixel that is output by the DSP1 701.

Optionally, the ISP1 702 may further implement functions such as a black level correction, shadow correction, defect pixel removal, gamma, RGB to YUV, 3D noise reduction, image sharpening, and an automatic contrast correction.

The ISP2 703 is configured to determine a third image based on the color channel value of the II pixel and the color channel value of the I pixel.

Optionally, the ISP1 703 may further implement functions such as a black level correction, shadow correction, defect pixel removal, white balance, raw-domain noise reduction, mosaic removal, color correction, gamma, RGB to YUV, 3D noise reduction, image sharpening, an automatic contrast correction, haze penetration, and photographic magnification.

The DSP2 704 is configured to fuse the second image that is output by the ISP1 702 and the third image that is output by the ISP2 703, to obtain a target image.

For other steps, refer to steps performed by the image processing apparatus in the foregoing embodiments. Details are not described herein again.

The image processing apparatus further includes a storage unit (not shown in the figure). The storage unit is connected to the DSP or the ISP, and is configured to store a program or data that is output by the DSP1 701, the DSP2 704, the ISP1 702, or the ISP2 703, or is configured to store data obtained by the DSP1 701, the DSP2 704, the ISP1 702, or the ISP2 703. The storage unit may be a memory, and the memory is mainly configured to store a software program and data. The memory may exist independently and be connected to the processor. Optionally, the memory and the processor may be integrated, for example, integrated into one or more chips. The memory can store program code for executing the technical solutions in the embodiments of this application, and the processor controls the execution. Various types of executed computer program code may also be considered as drivers of the processor.

It should be understood that, during actual application, the image processing apparatus may have a plurality of memories. This is not specifically limited herein. In addition, the memory may also be referred to as a storage medium, a storage device, or the like. The memory may be a storage element located on a same chip as the DSP or the ISP, that is, an on-chip storage element or an independent storage element. This is not limited in this embodiment of this application.

In this embodiment, two DSPs are added only on the basis of a conventional ISP. The DSP1 processes the first image, and separately transmits a signal having only a luminance channel value to the ISP1 for processing to obtain the second image and transmits a signal having only a color channel value to the ISP2 for processing to obtain the third image. Finally, the DSP2 fuses the second image and the third image to obtain the target image. In the image processing apparatus, only one DSP processing module is added before and after conventional ISP processing modules (namely, the ISP1 and the ISP2), and a conventional ISP processing link does not need to be changed, so that system maintenance is simple and easy.

Figure 8:
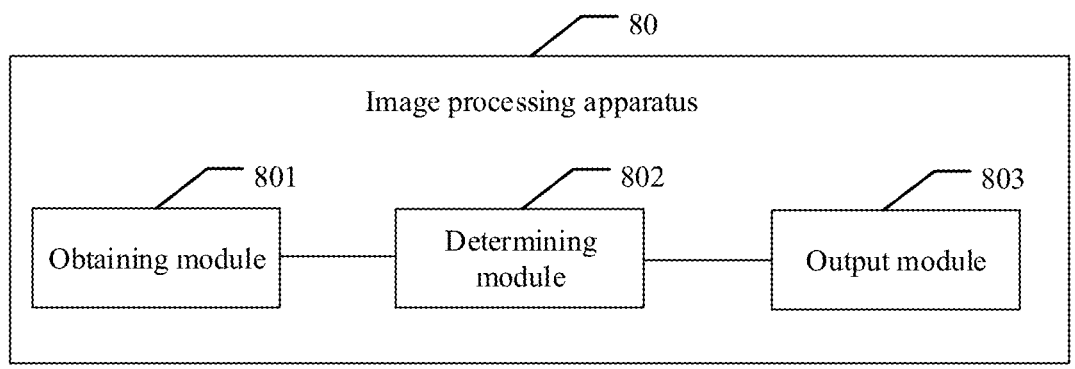
FIG. 8 is a schematic diagram of another embodiment of an image processing apparatus according to an embodiment of this application.

FIG. 8 is an optional structure of an image processing apparatus 80 according to an embodiment of this application. The image processing apparatus 80 may be a function unit or a system on a chip (SoC) in a photographing apparatus. The image processing apparatus 80 includes an obtaining module 801, a determining module 802, and an output module 803. The obtaining module 801 is configured to obtain a first image from a target image sensor. The determining module 802 is configured to determine a complementary color channel value of a color channel value based on the color channel value. The determining module 802 is further configured to determine three channel values of a target pixel based on a luminance channel value carried by at least one I pixel and a complementary color channel value carried by at least one II pixel, where the three channel values of the target pixel are used to indicate a color and luminance of the target pixel. Finally, the output module 803 outputs a target image including a plurality of target pixels.

It should be understood that the first image includes an I pixel group and an II pixel group. The I pixel group includes a plurality of I pixels, and the II pixel group includes a plurality of II pixels. In addition, each I pixel carries one luminance channel value, and each II pixel carries one color channel value. Moreover, both the I pixel and the II pixel are single-channel pixels.

It should be further understood that a color channel corresponding to the color channel value includes one of a cyan channel, a magenta channel, or a yellow channel; and a color channel corresponding to the complementary color channel value includes one of a red channel, a green channel, or a blue channel.

In this embodiment, each I pixel in the I pixel group in the first image obtained by the image processing apparatus from the target image sensor carries the luminance channel value, so that details of the target image that is output by the image processing apparatus are sharp. In addition, each II pixel in the II pixel group in the first image carries the color channel value, so that the target image that is output by the image processing apparatus has colors. Then, the target image is determined based on the foregoing I pixel group and the foregoing II pixel group, so that the foregoing image colors and the foregoing image details are fused to obtain the sharp target image with rich colors. In addition, in this solution, one image from one image sensor instead of two image sensors is processed, and a time-sharing system does not need to be set. This helps simplify an internal system of the image processing apparatus.

In an optional implementation, the determining module 802 is further configured to determine a luminance channel value of the II pixel based on the luminance channel value of the at least one I pixel. The determining module 802 is further configured to determine a color channel value of the I pixel based on a color channel value of the at least one II pixel.

In this implementation, in the first image, an II pixel is adjacent to or close to at least one I pixel, and the at least one I pixel around the II pixel carries a luminance channel value, so that a luminance channel value of the II pixel can be determined based on the luminance channel value of the at least one I pixel. By analogy, the luminance channel value of each II pixel in the II pixel group is determined based on the luminance channel value of each I pixel in the I pixel group. This helps determine luminance information of the II pixel. Therefore, an II pixel for which only color information is recorded also has luminance information, so that a contour and details of a photographed object can be reflected due to luminance of each pixel in the first image. In addition, because a color channel value of an I pixel may be determined based on a color channel value of an II pixel, an I pixel for which only luminance information is recorded may also have color information, so that a color presented by the photographed object can be reflected due to a color of each pixel in the first image.

In another optional implementation, color channels corresponding to color channel values of the II pixel are the same as color channels corresponding to color channel values of the I pixel. The determining module 802 is specifically configured to: determine a cyan channel value of the I pixel based on a cyan channel value of the at least one II pixel; determine a magenta channel value of the I pixel based on a magenta channel value of the at least one II pixel; and determine a yellow channel value of the I pixel based on a yellow channel value of the at least one II pixel.

In this implementation, an optional manner of determining a color channel value of an I pixel is provided. In this implementation, the image processing apparatus performs an interpolation operation based on a same color channel value. This helps ensure accuracy of an interpolation result and reduce pixel errors. In addition, in this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a color channel value obtained through interpolation calculation may be more realistic.

In another optional implementation, color channels corresponding to color channel values of the II pixel are not exactly the same as color channels corresponding to color channel values of the I pixel. The determining module 802 is specifically configured to: determine a cyan channel value of the I pixel based on at least one of a cyan channel value, a magenta channel value, or a yellow channel value in the II pixel group; determine a magenta channel value of the I pixel based on at least one of the cyan channel value, the magenta channel value, or the yellow channel value in the II pixel group; and determine a yellow channel value of the I pixel based on at least one of the cyan channel value, the magenta channel value, or the yellow channel value in the II pixel group.

In this implementation, another optional manner of determining a color channel value of an I pixel is provided. In this implementation, the image processing apparatus performs an interpolation operation based on different color channel values. This helps make an image obtained after interpolation have rich colors. In addition, in this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a color channel value obtained through interpolation calculation may be more realistic.

In another optional implementation, the determining module 802 is further configured to determine three color channel values of a first II pixel based on different color channel values of one or more II pixels around the first II pixel.

In this implementation, an II pixel in the first image has only one color channel value, and one color channel value cannot present a color. Therefore, the image processing apparatus needs to supplement three color channel values of the II pixel, so that the II pixel can reflect a color.

In another optional implementation, the determining module 802 is specifically configured to: determine a cyan channel value of the second II pixel based on at least two of a cyan channel value, a magenta channel value, or a yellow channel value of the one or more II pixels around the first II pixel; determine a magenta channel value of the second II pixel based on at least two of the cyan channel value, the magenta channel value, or the yellow channel value of the one or more II pixels around the first II pixel; and determine a yellow channel value of the second II pixel based on at least two of the cyan channel value, the magenta channel value, or the yellow channel value of the one or more II pixels around the first II pixel.

In this implementation, interpolation is performed based on color channel values such as a cyan channel value, a magenta channel value, and a yellow channel value. Herein, cyan is complementary to red, so that cyan can reflect a ratio of green to blue; magenta is complementary to green, so that magenta can reflect a ratio of red to blue; and yellow is complementary to blue, so that yellow can reflect a ratio of red to green. Therefore, a color reflected by a complementary color channel value obtained through interpolation calculation may be more realistic.

In another optional implementation, the determining module 802 is specifically configured to determine a luminance channel value of the first II pixel based on a luminance channel value of at least one I pixel around the first II pixel.

In this implementation, in the first image, an II pixel is adjacent to or close to at least one I pixel, and the at least one I pixel around the II pixel carries a luminance channel value, so that a luminance channel value of the II pixel can be determined based on the luminance channel value of the at least one I pixel. By analogy, the luminance channel value of each II pixel in the II pixel group is determined based on the luminance channel value of each I pixel in the I pixel group. This helps determine luminance information of the II pixel. Therefore, an II pixel for which only color information is recorded also has luminance information, so that a contour and details of a photographed object can be reflected due to luminance of each pixel in the first image.

In another optional implementation, the determining module 802 is specifically configured to: respectively convert three color channel values of the II pixel into three complementary color channel values of the II pixel; and respectively convert three color channel values of the I pixel into three complementary color channel values of the I pixel.

Further, in an optional implementation, after supplementing missing color channel values of the foregoing II pixel, the image processing apparatus may replace the three color channel values of the II pixel with the complementary color channel values. For example, if a specific II pixel has only a cyan channel value, the image processing apparatus first determines a magenta channel value and a yellow channel value of the II pixel, and then converts the foregoing three color channel values into complementary color channel values.

Further, in another optional implementation, the image processing apparatus may directly convert each color channel value in the first image into a complementary color channel value, and then supplement the remaining complementary color channel values of the II pixel. For example, if a specific II pixel has only a cyan channel value, the image processing apparatus first converts the cyan channel value of the II pixel into a magenta channel value, and then determines a green channel and a blue channel value of the II pixel.

In this implementation, the cyan channel value, the magenta channel value, and the yellow channel value are respectively converted into the red channel value, the green channel value, and the blue channel value. This helps perform an RGB pixel processing procedure (for example, a black level correction, shadow correction, defect pixel removal, white balance, raw-domain noise reduction, mosaic removal, or color correction) after a relatively accurate color channel value of each pixel is obtained, and helps simplify the internal system of the image processing apparatus.

In another optional implementation, the determining module 802 is specifically configured to fuse a second image and a third image to obtain the target image, where the second image carries the luminance channel value of the I pixel and the luminance channel value of the II pixel, and the third image carries the three complementary color channel values of the II pixel and the three complementary color channel values of the I pixel.

In this implementation, because the foregoing second image carries only a luminance channel value, only luminance can be reflected and a color cannot be reflected; and because the foregoing third image carries only a color channel value, only a color can be reflected and luminance cannot be reflected. Therefore, the image processing apparatus needs to fuse the second image and the third image to determine the target image. Each pixel in the target image carries luminance information and color information. Therefore, the target image may reflect color and luminance distribution of light recorded by the target image sensor. This helps obtain a target image with rich colors and sharp details.

It should be understood that first, second, third, fourth, and various digital numbers in this specification are merely used for distinction for ease of description, but are not intended to limit the scope of the embodiments of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally represents an "or" relationship between the associated objects.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It can be clearly understood by persons skilled in the art that, for a purpose of convenient and brief description, for detailed working processes of the foregoing system, apparatus, and unit, refer to corresponding processes in the foregoing method embodiments. Details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An image processing method, comprising:
obtaining an input image from an image sensor, wherein the input image comprises pixels including a plurality of type-I pixels and a plurality of type-II pixels, each pixel of the input image is either a type-I pixel or a type-II pixel, each type-I pixel carries a luminance channel value and no color data, each type-II pixel carries a single color channel value and no luminance data, and the single color channel value is a cyan channel value, a magenta channel value, or a yellow channel value;
generating a target image by performing interpolation based on the luminance channel values and the single color channel values of the pixels of the input image,
wherein each pixel in the target image corresponds in location to a pixel in the input image and has three color channel values generated by the interpolation; and
outputting the target image,
wherein the step of generating the target image comprises:
generating a first image by performing a first interpolation operation based on the luminance channel values of the plurality of type-I pixels, wherein each pixel in the first image corresponds in location to a pixel in the input image and has a luminance channel value generated by the first interpolation operation;
generating a second image by performing a second interpolation operation based on the single color channel values of the plurality of type-II pixels, wherein each pixel in the second image corresponds in location to a pixel in the input image, and has three color channel values generated by the second interpolation operation; and
fusing the first image and the second image to generate the target image,
wherein the step of generating the second image comprises:

converting each type-II pixel in the input image into a corresponding converted pixel that carries three color channel values;

for a second pixel of the second image, determining a second group of converted pixels, wherein each converted pixel in the second group corresponds in position to the second pixel or to a pixel adjacent to the second pixel in the second image; and determining three color channel values of the second pixel by performing the second interpolation operation based on the color channel values of the converted pixels in the second group.

2. The image processing method according to claim 1, wherein the step of fusing the first image and the second image to generate the target image comprises:

fusing a first pixel of the first image and a second pixel of the second image to generate a target pixel in the target image, wherein the target pixel in the target image, the first pixel in the first image, and the second pixel in the second image correspond in location to each other.

3. The image processing method according to claim 1, wherein the step of generating the first image comprises:

for a first pixel of the first image, determining a first group of type-I pixels in the input image, wherein each type-I pixel in the first group corresponds in location to the first pixel in the first image or to a pixel in the first image adjacent to the first pixel; and determining a luminance channel value of the first pixel by performing the first interpolation operation based on the luminance channel values of the first group of type-I pixels of the input image.

4. The image processing method according to claim 3, wherein the step of determining the luminance channel value of the first pixel comprises:

performing weighted average on the luminance channel values of type-I pixels in the first group to determine the luminance channel value of the first pixel.

5. The image processing method according to claim 1, wherein the step of generating the second image comprises:

for a second pixel of the second image, determining a second group of type-II pixels in the input image, wherein the second group comprises 3 or more type-II pixels, each type-II pixel in the second group corresponds in location to the second pixel in the second image or to a pixel in the second image adjacent to the second pixel; and determining three color channel values of the second pixel by performing the second interpolation operation based on the single color channel values of the type-II pixels in the second group.

6. The image processing method according to claim 5, wherein the step of determining the three color channel values of the second pixel comprises:

determining a cyan channel value of the second pixel based on at least one type-II pixel in the second group that carries a cyan channel value;

determining a magenta channel value of the second pixel based on at least one type-II pixels in the second group that carries a magenta channel value; and determining a yellow channel value of the second pixel based on at least one type-II pixel in the second group that carries a yellow channel value.

7. The image processing method according to claim 1, wherein the step of converting each type-II pixel into a corresponding converted pixel comprises:

for a third type-II pixel that carries a cyan channel value, determining a magenta channel value for the third type-II pixel based on at least one type-II pixel that is adjacent to the third type-II pixel and carries a magenta channel value, and determining a yellow channel value for the third type-II pixel based on at least one type-II pixel that is adjacent to the third type-II pixel and carries a yellow channel value;

for a fourth type-II pixel that carries a magenta channel value, determining a cyan channel value for the fourth type-II pixel based on at least one type-II pixel that is adjacent to the fourth type-II pixel and carries a cyan channel value, and determining a yellow channel value for the fourth type-II pixel based on at least one type-II pixel that is adjacent to the fourth type-II pixel and carries a yellow channel value; and for a fifth type-II pixel that carries a yellow channel value, determining a magenta channel value for the fifth type-II pixel based on at least one type-II pixel that is adjacent to the fifth type-II pixel and carries a magenta channel value, and determining a cyan channel value for the fifth type-II pixel based on at least one type-II pixel adjacent to the fifth type-II pixel and carries a cyan channel value.

8. The image processing method according to claim 1, wherein each pixel of the target image comprises a red channel value, a green channel value, and a blue channel value, and wherein before the step of fusing, the method further comprises:

converting a cyan channel value of each pixel of the second image into a red channel value;

converting a magenta channel value of each pixel of the second image into a green channel value; and converting a yellow channel value of each pixel of the second image into a blue channel value.

9. The image processing method according to claim 1, wherein each pixel of the target image comprises a red channel value, a green channel value, and a blue channel value, each pixel of the second image comprises a red channel value, a green channel value, and a blue channel value, and wherein before the step of generating the second image, the method further comprises:

for each type-II pixel that carries a cyan channel value, converting the cyan channel value into a red channel value;

for each type-II pixel that carries a magenta channel value, converting the magenta channel value into a green channel value; and for each type-II pixel that carries a yellow channel value, converting the yellow channel value into a blue channel value.

10. An image processing apparatus comprising:

an image sensor for obtaining an input image by using a colorless sensing unit group and a colored sensing unit group, wherein the colorless sensing unit group is configured to record luminance information of visible light or infrared light to obtain a plurality of type-I pixels, and the colored sensing unit group is configured to record color information of the visible light to obtain a plurality of type-II pixels, each type-I pixel carries a luminance channel value and no color data, each type-II pixel carries a single color channel value and no luminance data, and the single color channel value is a cyan channel value, a magenta channel value, or a yellow channel value, the input image comprises pixels including the plurality of type-I pixels and the plurality of type-II pixels, and each pixel of the input image is either a type-I pixel or a type-II pixel;

a memory storing computer executable instructions; and
a processor connected to the memory and the target image sensor and configured to execute the computer executable instructions to perform operations of:
obtaining the input image from the target image sensor;
generating a target image by performing interpolation based on the luminance channel values and the single color channel values of the pixels of the input image, wherein each pixel in the target image corresponds in location to a pixel in the input image and has three color channel values generated by the interpolation; and
outputting the target image,
wherein the operation of generating the target image comprises:
generating a first image by performing a first interpolation operation based on the luminance channel values of the plurality of type-I pixels, wherein each pixel in the first image corresponds in location to a pixel in the input image and has a luminance channel value generated by the first interpolation operation;
generating a second image by performing a second interpolation operation based on the single color channel values of the plurality of type-II pixels, wherein each pixel in the second image corresponds in location to a pixel in the input image, and has three color channel values generated by the second interpolation operation; and
fusing the first image and the second image to generate the target image,
wherein the operation of generating the second image comprises:
converting each type-II pixel in the input image into a corresponding converted pixel that carries three color channel values;
for a second pixel of the second image, determining a second group of converted pixels, wherein each converted pixel in the second group corresponds in position to the second pixel or to a pixel adjacent to the second pixel in the second image; and
determining three color channel values of the second pixel by performing the second interpolation operation based on the color channel values of the converted pixels in the second group.

11. The image processing apparatus according to claim 10, wherein the operation of fusing the first image and the second image to generate the target image comprises:
fusing a first pixel of the first image and a second pixel of the second image to generate a target pixel in the target image, wherein the target pixel in the target image, the first pixel in the first image, and the second pixel in the second image correspond in location to each other.

12. The image processing apparatus according to claim 10, wherein the operation of generating the first image comprises:
for a first pixel of the first image, determining a first group of type-I pixels in the input image, wherein each type-I pixel in the first group corresponds in location to the first pixel in the first image or to a pixel in the first image adjacent to the first pixel; and determining a luminance channel value of the first pixel by performing the first interpolation operation based on the luminance channel values of the first group of type-I pixels of the input image.

13. The image processing apparatus according to claim 10, wherein the operation of generating the second image comprises:
for a second pixel of the second image, determining a second group of type-II pixels in the input image, wherein the second group comprises 3 or more type-II pixels, each type-II pixel in the second group corresponds in location to the second pixel in the second image or to a pixel in the second image adjacent to the second pixel; and
determining three color channel values of the second pixel by performing the second interpolation operation based on the single color channel values of the type-II pixels in the second group.

14. The image processing apparatus according to claim 13, wherein the operation of determining the three color channel values of the second pixel comprises:
determining a cyan channel value of the second pixel based on at least one type-II pixel in the second group that carries a cyan channel value;
determining a magenta channel value of the second pixel based on at least one type-II pixels in the second group that carries a magenta channel value; and
determining a yellow channel value of the second pixel based on at least one type-II pixel in the second group that carries a yellow channel value.

15. The image processing apparatus according to claim 10, wherein each pixel of the target image comprises a red channel value, a green channel value, and a blue channel value, and wherein before the step of fusing, the operations further comprises:
converting a cyan channel value of each pixel of the second image into a red channel value;
converting a magenta channel value of each pixel of the second image into a green channel value; and
converting a yellow channel value of each pixel of the second image into a blue channel value.

16. The image processing apparatus according to claim 10, wherein each pixel of the target image comprises a red channel value, a green channel value, and a blue channel value, each pixel of the second image comprises a red channel value, a green channel value, and a blue channel value, and wherein before the step of generating the second image, the operations further comprises:
for each type-II pixel that carries a cyan channel value, converting the cyan channel value into a red channel value;
for each type-II pixel that carries a magenta channel value, converting the magenta channel value into a green channel value; and
for each type-II pixel that carries a yellow channel value, converting the yellow channel value into a blue channel value.

* * * * *